US012558886B2

(12) United States Patent
Kawakami et al.

(10) Patent No.: US 12,558,886 B2
(45) Date of Patent: Feb. 24, 2026

(54) HEAD UNIT AND LIQUID EJECTING APPARATUS

(71) Applicant: SEIKO EPSON CORPORATION, Tokyo (JP)

(72) Inventors: Masayuki Kawakami, Nagano (JP); Yasuhiko Kosugi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 137 days.

(21) Appl. No.: 18/413,094

(22) Filed: Jan. 16, 2024

(65) Prior Publication Data

US 2024/0253346 A1 Aug. 1, 2024

(30) Foreign Application Priority Data

Jan. 17, 2023 (JP) ................................ 2023-005295

(51) Int. Cl.
*B41J 2/045* (2006.01)
*B41J 2/14* (2006.01)

(52) U.S. Cl.
CPC ....... *B41J 2/04563* (2013.01); *B41J 2/04553* (2013.01); *B41J 2/04581* (2013.01); *B41J 2/04588* (2013.01); *B41J 2/14274* (2013.01); *B41J 2002/14354* (2013.01)

(58) Field of Classification Search
CPC ......................... B41J 2/04563; B41J 2/04553; B41J 2/04581; B41J 2/04588; B41J 2/14274; B41J 2002/14354
See application file for complete search history.

(56) References Cited

U.S. PATENT DOCUMENTS

| | | | | |
|---|---|---|---|---|
| 5,638,097 | A * | 6/1997 | Takayanagi | B41J 25/34 347/49 |
| 2009/0040259 | A1* | 2/2009 | Kim | B41J 2/04541 347/17 |
| 2020/0406610 | A1* | 12/2020 | Yamada | B41J 2/14233 |
| 2022/0258472 | A1 | 8/2022 | Hirai et al. | |
| 2024/0190128 | A1* | 6/2024 | Miyazawa | B41J 2/04581 |

FOREIGN PATENT DOCUMENTS

| | | |
|---|---|---|
| JP | 2022-124599 A | 8/2022 |

* cited by examiner

*Primary Examiner* — King Y Poon
(74) *Attorney, Agent, or Firm* — Spencer Fane LLP

(57) ABSTRACT

There is provided a head unit in which a first print head that ejects a liquid includes: a first nozzle for ejecting the liquid according to change in the volume of the first pressure chamber; and a first temperature detection section that detects first temperature information corresponding to a temperature of the first pressure chamber and outputs the first temperature information as a first temperature signal, and a temperature information output circuit that outputs a temperature information signal indicating a temperature of the first print head includes: a first amplification circuit that amplifies a difference between a first reference potential signal and the first temperature signal, an output control circuit that outputs a temperature information signal according to an output of the first amplification circuit, and a reference voltage control circuit that controls a voltage value of the first reference potential signal.

10 Claims, 16 Drawing Sheets

| | | LD | MD | SD | ND |
|---|---|---|---|---|---|
| [SIH, SIL] | | [1, 1] | [1, 0] | [0, 1] | [0, 0] |
| S | T1 | H | H | L | L |
| | T2 | H | L | H | L |
| | T3 | L | L | L | H |

HEAD UNIT AND LIQUID EJECTING APPARATUS

The present application is based on, and claims priority from JP Application Serial Number 2023-005295, filed Jan. 17, 2023, the disclosure of which is hereby incorporated by reference herein in its entirety.

BACKGROUND

1. Technical Field

The present disclosure relates to a head unit and a liquid ejecting apparatus.

2. Related Art

A liquid ejecting apparatus having a configuration including a print head having a piezoelectric element, a pressure chamber, and a nozzle communicating with the pressure chamber, is known. The print head ejects a liquid supplied to the pressure chamber from the nozzle by changing a volume of the pressure chamber by driving the piezoelectric element. A technology of the liquid ejecting apparatus including such a print head, which implements ejection control suitable for a temperature of an ink by driving the piezoelectric element based on the temperature of the ink stored in the print head, is known.

For example, JP-A-2022-124599 discloses a technology in which a temperature detection section that detects a temperature of a pressure chamber in which ink is stored is provided in a print head having a piezoelectric element, the pressure chamber, and a nozzle so that a temperature difference between the temperature detected by the temperature detection section and the temperature in the pressure chamber can be reduced and accuracy of detecting the temperature of the ink stored in the pressure chamber is enhanced.

However, in the configuration in which the temperature detection section is provided in the print head, such as the liquid ejecting apparatus disclosed in JP-A-2022-124599, the technology disclosed in JP-A-2022-124599 is insufficient in terms of improving acquisition accuracy of the temperature of the print head and there is room for improvement.

SUMMARY

An aspect of a head unit according to the present disclosure is a head unit that ejects a liquid by receiving a drive signal corrected based on a temperature information signal, the head unit including: a first print head that receives the drive signal and ejects a liquid; and a temperature information output circuit that outputs the temperature information signal indicating a temperature of the first print head, in which the first print head includes: a first piezoelectric element including a first electrode, a second electrode, and a first piezoelectric body, having the first piezoelectric body that is located between the first electrode and the second electrode in a first stacking direction in which the first electrode, the second electrode, and the first piezoelectric body are stacked, and driven by receiving the drive signal; a first vibration plate located on one side of the first piezoelectric element in the first stacking direction and deformed due to drive of the first piezoelectric element; a first pressure chamber substrate located on one side of the first vibration plate in the first stacking direction and provided with a first pressure chamber having a volume that changes due to deformation of the first vibration plate; a first nozzle for ejecting the liquid according to change in the volume of the first pressure chamber; and a first temperature detection section located on another side of the first vibration plate in the first stacking direction to detect first temperature information corresponding to a temperature of the first pressure chamber and output the first temperature information as a first temperature signal, and the temperature information output circuit includes: a first amplification circuit that amplifies a difference between a first reference potential signal and the first temperature signal; an output control circuit that outputs the temperature information signal according to an output of the first amplification circuit; and a reference voltage control circuit that controls a voltage value of the first reference potential signal.

According to an aspect of the present disclosure, there is provided a liquid ejecting apparatus including: a drive signal output circuit that outputs a drive signal corrected based on a temperature information signal; and a head unit that ejects a liquid by receiving the drive signal, in which the head unit includes: a first print head that receives the drive signal and ejects a liquid; and a temperature information output circuit that outputs the temperature information signal indicating a temperature of the first print head, the first print head includes: a first piezoelectric element including a first electrode, a second electrode, and a first piezoelectric body, having the first piezoelectric body that is located between the first electrode and the second electrode in a first stacking direction in which the first electrode, the second electrode, and the first piezoelectric body are stacked, and driven by receiving the drive signal; a first vibration plate located on one side of the first piezoelectric element in the first stacking direction and deformed due to drive of the first piezoelectric element; a first pressure chamber substrate located on one side of the first vibration plate in the first stacking direction and provided with a first pressure chamber having a volume that changes due to deformation of the first vibration plate; a first nozzle for ejecting the liquid according to change in the volume of the first pressure chamber; and a first temperature detection section located on another side of the first vibration plate in the first stacking direction to detect first temperature information corresponding to a temperature of the first pressure chamber and output the first temperature information as a first temperature signal, and the temperature information output circuit includes: a first amplification circuit that amplifies a difference between a first reference potential signal and the first temperature signal; an output control circuit that outputs an output of the first amplification circuit as the temperature information signal; a reference voltage control circuit that controls a voltage value of the first reference potential signal.

DESCRIPTION OF EMBODIMENTS

Figure 1:
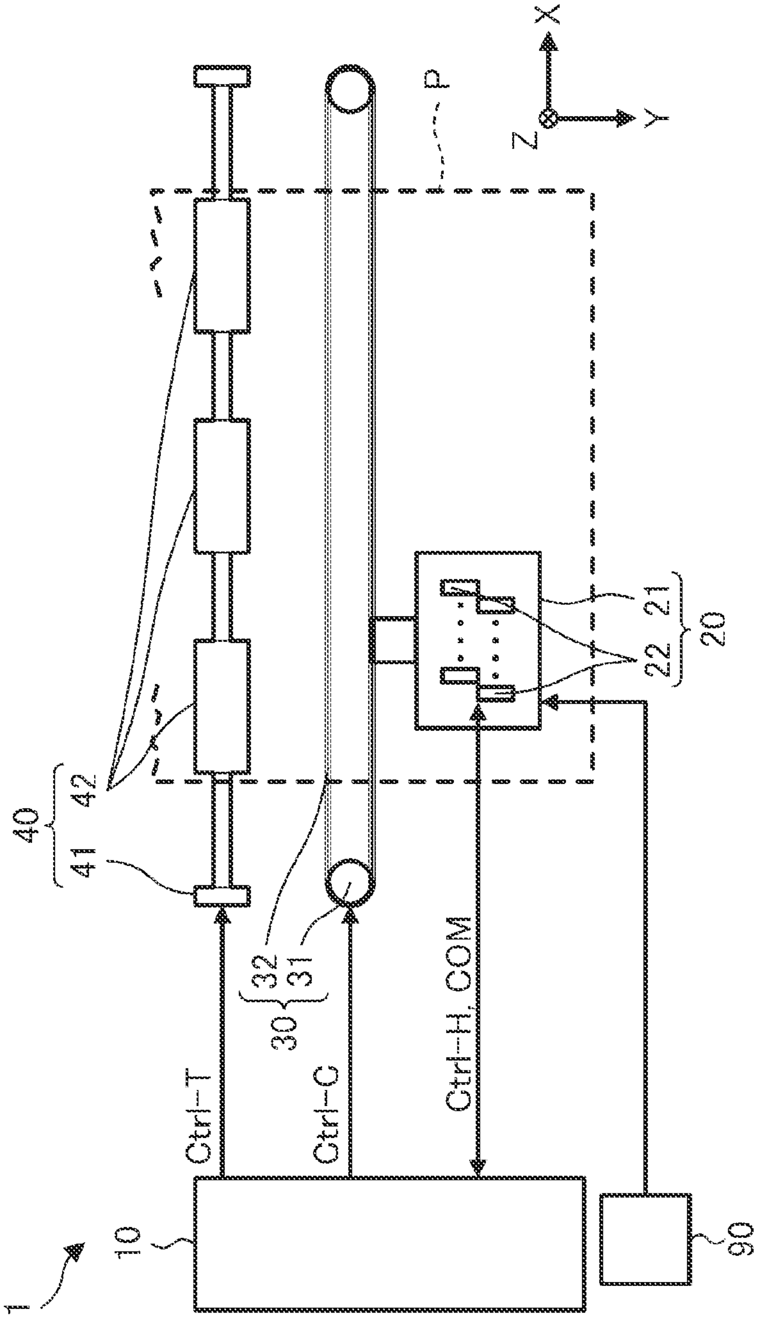
FIG. 1 is a diagram illustrating a schematic configuration of a liquid ejecting apparatus.

Hereinafter, preferable embodiments of the present disclosure will be described with reference to the drawings. The drawing to be used is for convenience of description. In addition, the embodiments which will be described below do not inappropriately limit the contents of the present disclosure described in the claims. Not all of the configurations which will be described below are necessarily essential components of the present disclosure.

1. Structure of Liquid Ejecting Apparatus Structure of Liquid Ejecting Apparatus FIG. 1 is a diagram illustrating a schematic configuration of a liquid ejecting apparatus 1. The liquid ejecting apparatus 1 according to the present embodiment is a serial printing-type ink jet printer in which a carriage 21 on which a print head 22 ejecting ink as an example of a liquid is mounted reciprocates along a scanning axis and ejects the ink to a medium P that is transported in a transport direction to form a desired image on the medium P. In addition, as the medium P used in the liquid ejecting apparatus 1, any printing target such as a printing paper, a resin film, or a cloth may be used. The liquid ejecting apparatus 1 is not limited to the serial printing-type ink jet printer, and may be a line printing-type ink jet printer. In addition, the liquid ejecting apparatus 1 is not limited to an ink jet printer, and may be a coloring material ejecting apparatus used for manufacturing a color filter such as a liquid crystal display, an electrode material ejecting apparatus used for forming an electrode such as an organic EL display and a field emission display (FED), a bioorganic substance ejecting apparatus used for manufacturing a biochip, a stereolithography apparatus, a textile printing apparatus, and the like.

In the following description, an X axis, a Y axis, and a Z axis, which are three spatial axes orthogonal to each other, will be used for description. In the following description, when respective directions along the X axis, the Y axis, and the Z axis are specified, the tip side of an arrow indicating the direction along the X axis illustrated in the drawings is referred to as a +X side, and the starting point side thereof is referred to as a −X side, the tip side of an arrow indicating the direction along the Y axis illustrated in the drawings is referred to as a +Y side, and the starting point side thereof is referred to as a −Y side, and the tip side of an arrow indicating the direction along the Z axis illustrated in the drawings is referred to as a +Z side, and the starting point side thereof may be referred to as a −Z side.

As illustrated in FIG. 1, the liquid ejecting apparatus 1 includes a control unit 10, a head unit 20, a moving unit 30, a transport unit 40, and an ink container 90.

A plurality of types of ink to be ejected to the medium P are stored in the ink container 90. As the ink container 90 in which such ink is stored, an ink cartridge, a bag-shaped ink pack made of a flexible film, an ink tank capable of replenishing ink, and the like may be used.

The control unit 10 includes a processing circuit such as a central processing unit (CPU) or a field programmable gate array (FPGA), and a storage circuit such as a semiconductor memory, and controls each element of the liquid ejecting apparatus 1 including the head unit 20.

The head unit 20 includes a carriage 21 and a plurality of print heads 22. The carriage 21 is fixed to an endless belt 32 of the moving unit 30 to be described later. The plurality of print heads 22 are mounted on the carriage 21. In addition, a control signal Ctrl-H and a drive signal COM, which are output by the control unit 10, are input to each of the plurality of print heads 22. Furthermore, the ink stored in the ink container 90 is supplied to each of the plurality of print heads 22 via a tube (not illustrated) or the like. The print head 22 ejects the ink supplied from the ink container 90 based on the input control signal Ctrl-H and drive signal COM. In this case, the direction from the −Z side to the +Z side along the Z axis, which is the direction along the Z axis, in which the print head 22 ejects the ink, may be referred to as an ejection direction.

The moving unit 30 includes a carriage motor 31 and the endless belt 32. The carriage motor 31 is operated based on a control signal Ctrl-C input from the control unit 10. The endless belt 32 extends along the X axis and rotates according to an operation of the carriage motor 31. As a result, the carriage 21 fixed to the endless belt 32 reciprocates along the X axis. That is, the moving unit 30 reciprocates the plurality of print heads 22 mounted on the carriage 21 along the X axis. In the following description, the direction along the X axis, in which the plurality of print heads 22 mounted on the carriage 21 move, may be referred to as a scanning direction.

The transport unit 40 includes a transport motor 41 and transport rollers 42. The transport motor 41 operates based on a control signal Ctrl-T input from the control unit 10. The transport rollers 42 rotate according to an operation of the transport motor 41 in a state where the medium P is pinched therebetween. As a result, the medium P pinched between the transport rollers 42 is transported from the −Y side toward the +Y side along the Y axis. That is, the transport unit 40 transports the medium P from the −Y side toward the +Y side along the Y axis. In the following description, the direction from the −Y side toward the +Y side, in which the medium P is transported, may be referred to as a transport direction.

In the liquid ejecting apparatus 1 configured as described above, the moving unit 30 controls the reciprocation of the carriage 21 along the scanning direction, and the transport unit 40 controls the transport of the medium P in the direction along the transport direction. The print head 22 mounted on the carriage 21 ejects the ink in conjunction with the reciprocation of the carriage 21 along the scanning direction and the transport of the medium P in the transport direction. As a result, the ink ejected by the print head 22 can be landed on any surface of the medium P, and a desired image is formed at the medium P.

Structure of Print Head

Figure 2:
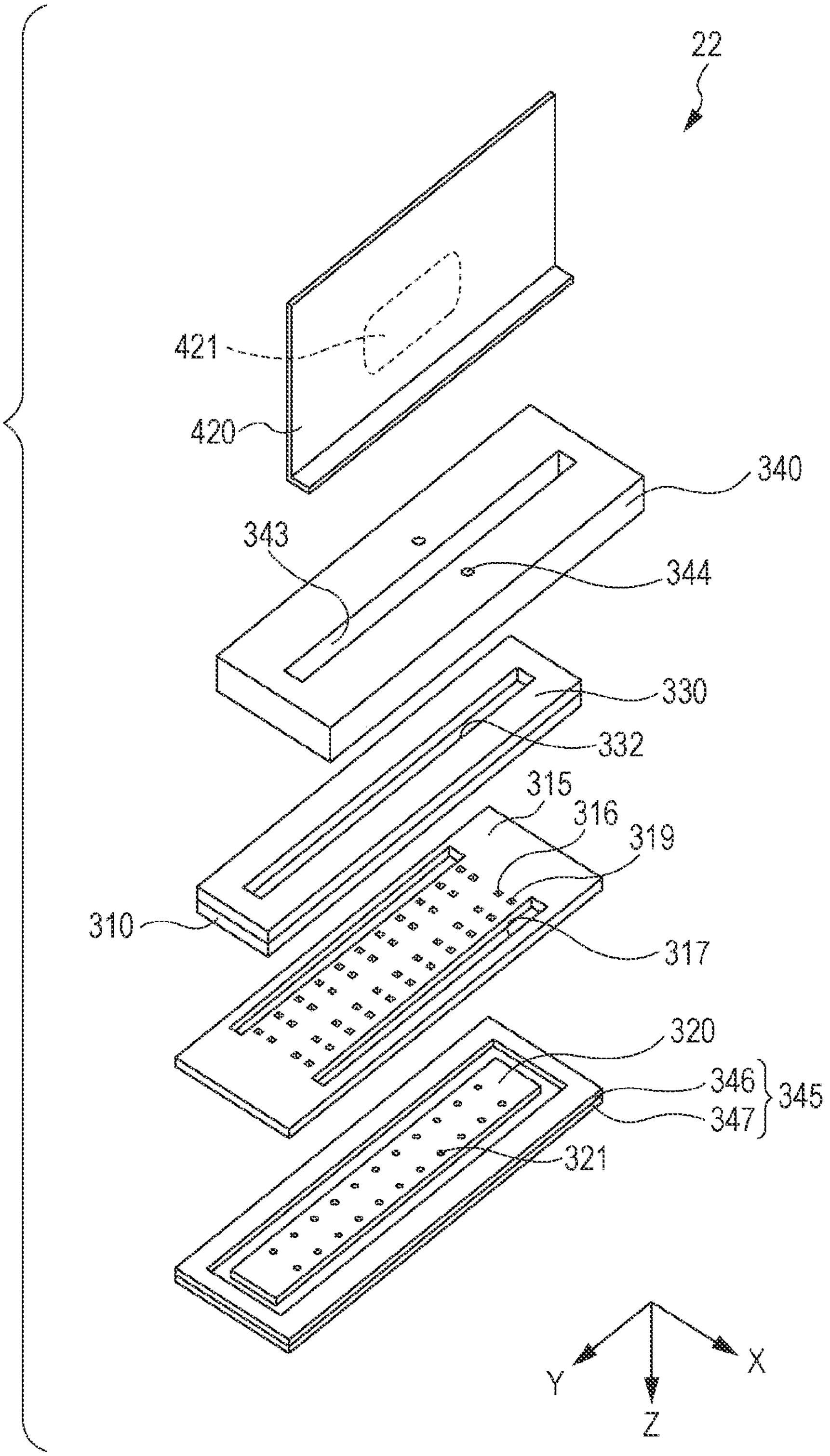
FIG. 2 is an exploded perspective view illustrating a structure of a print head.
Figure 3:
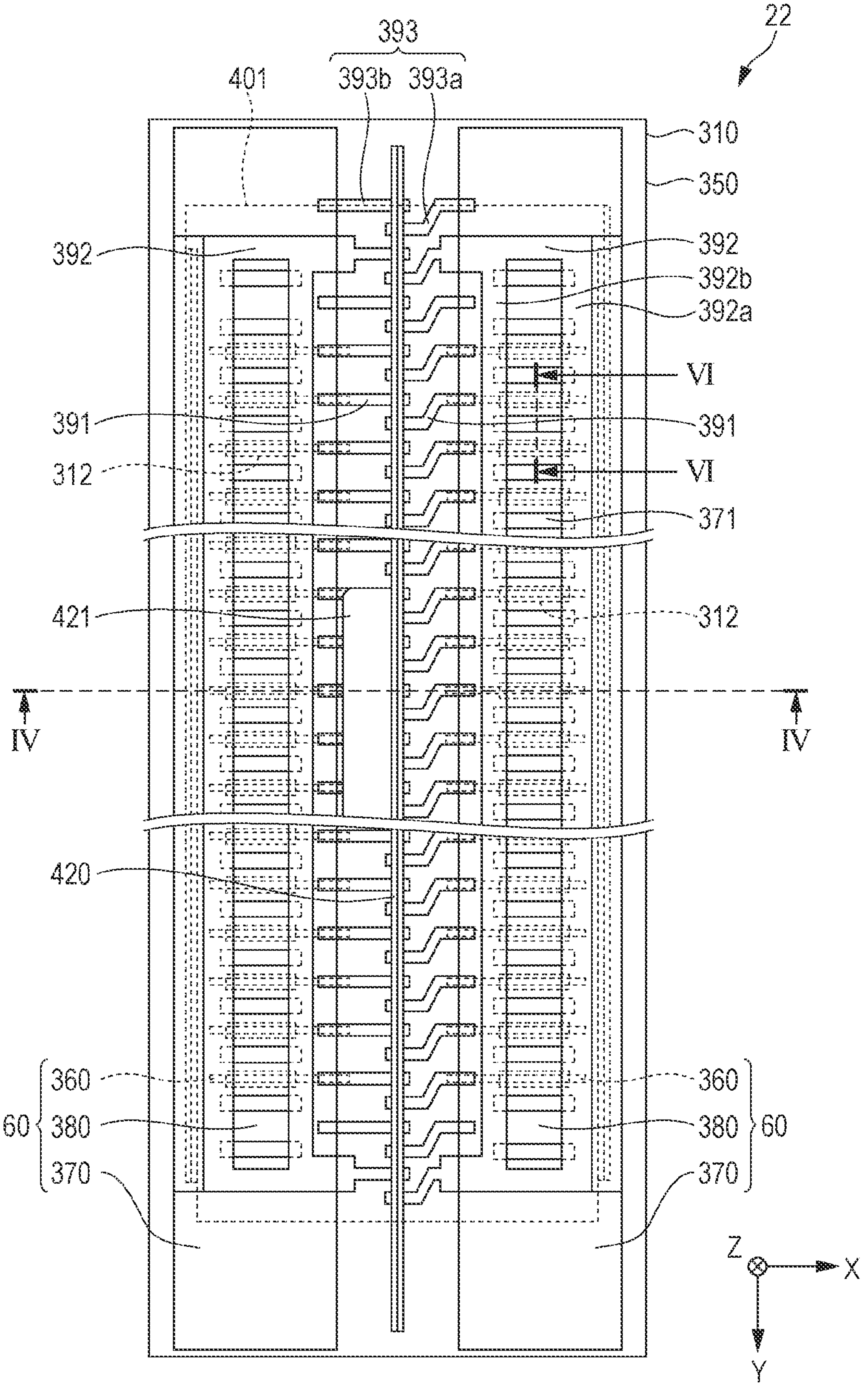
FIG. 3 is a plan view of the print head when viewed along a Z axis.
Figure 4:
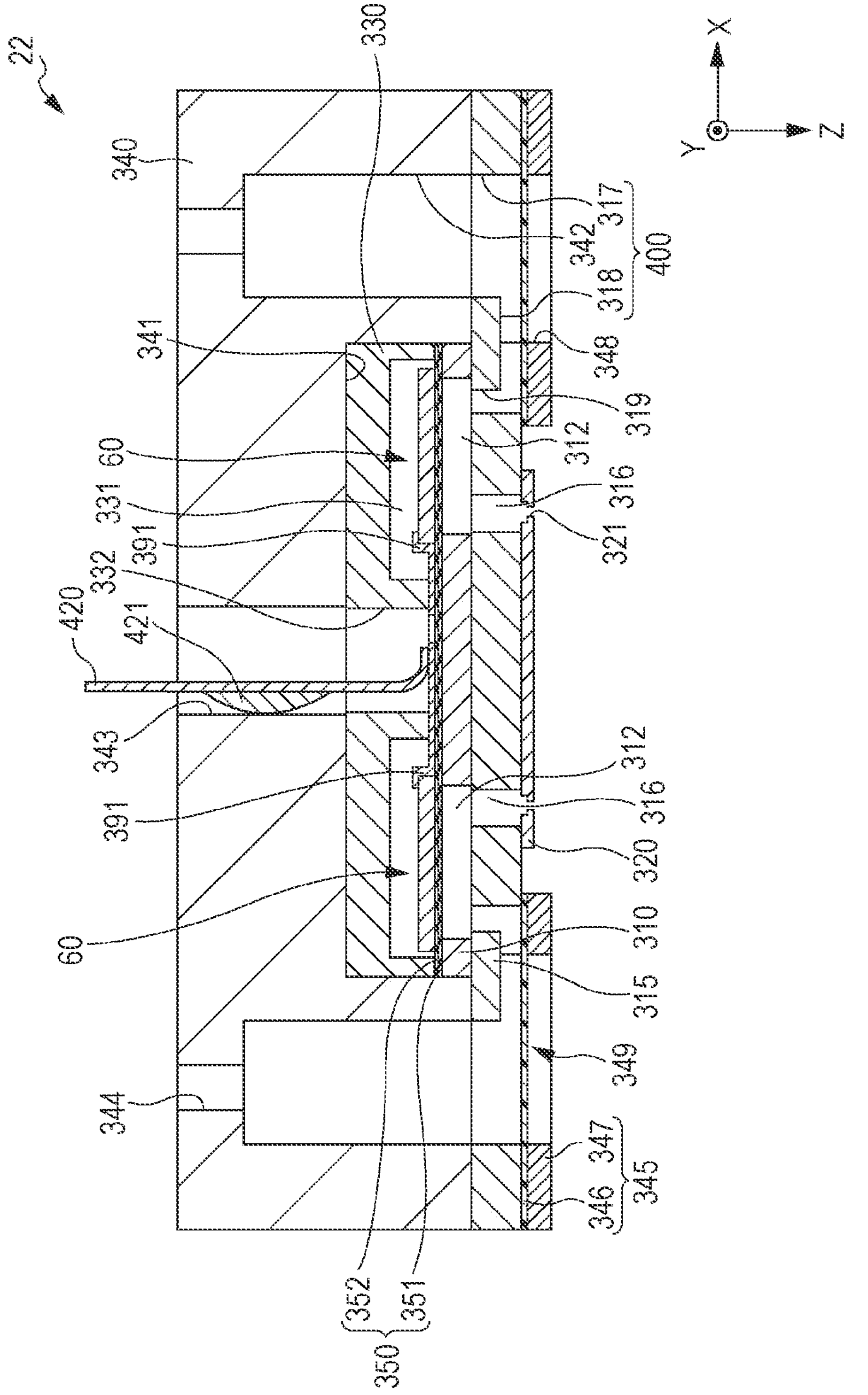
FIG. 4 is a sectional view taken along line IV-IV in FIG. 3.
Figure 5:
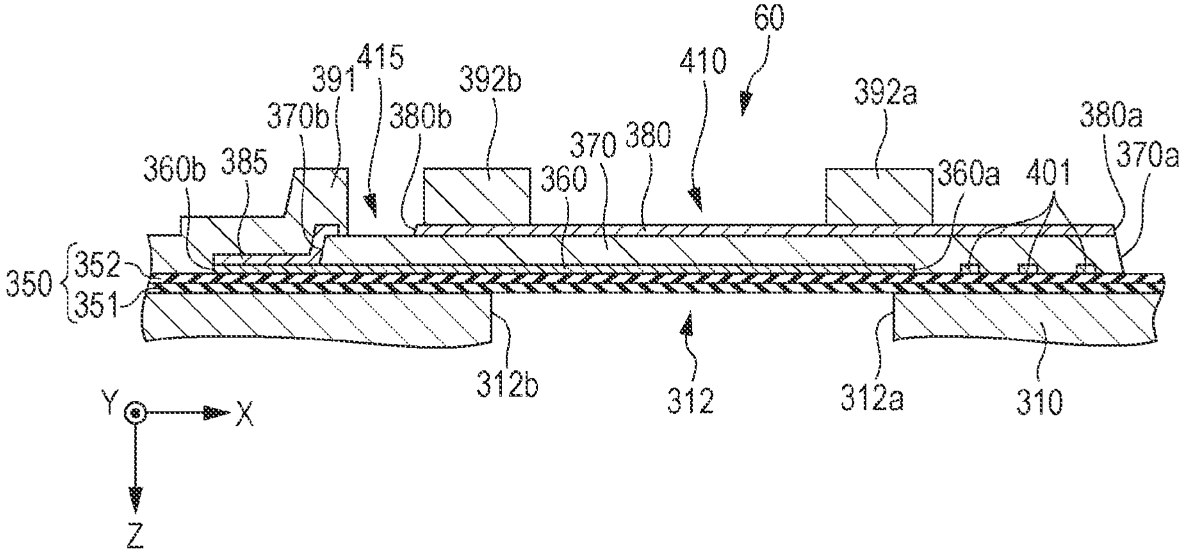
FIG. 5 is a main portion detailed view illustrating details of a main portion of a configuration in FIG. 4.
Figure 6:
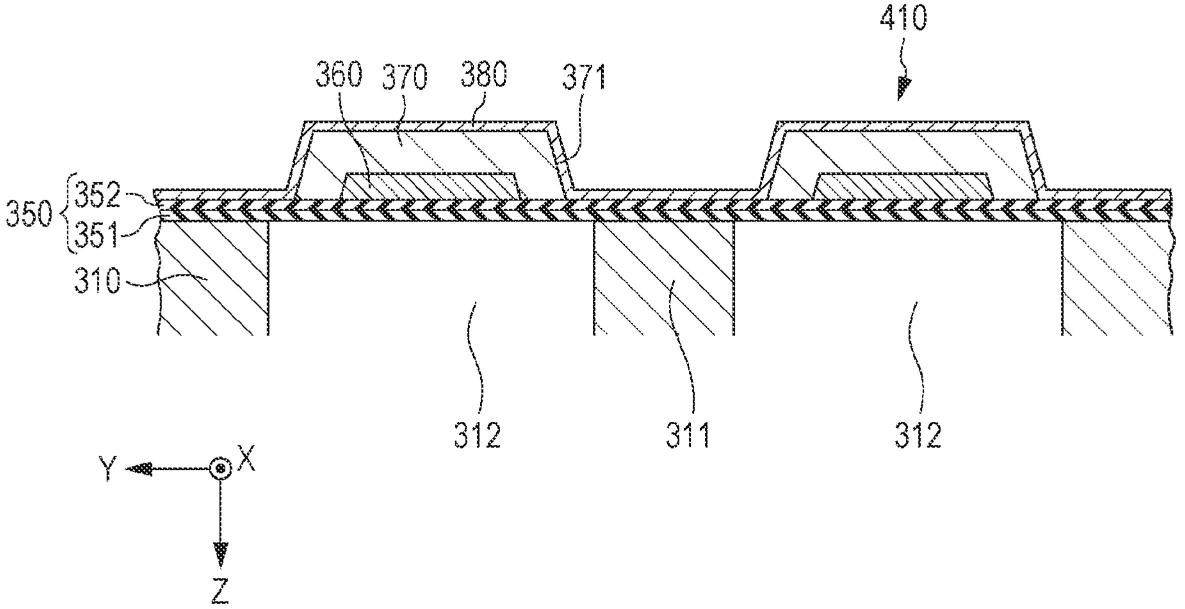
FIG. 6 is a sectional view taken along line VI-VI in FIG. 3.

Next, an example of a structure of the print head 22 of the head unit 20 will be described. FIG. 2 is an exploded perspective view illustrating a structure of the print head 22, FIG. 3 is a plan view of the print head 22 when viewed along a Z axis, FIG. 4 is a sectional view taken along line IV-IV in FIG. 3, FIG. 5 is a main portion detailed view illustrating details of a main portion of a configuration in FIG. 4, and FIG. 6 is a sectional view taken along line VI-VI in FIG. 3.

As illustrated in FIG. 2, the print head 22 includes a pressure chamber substrate 310, a communication plate 315, a nozzle plate 320, a compliance substrate 345, a vibration plate 350 to be described later, a piezoelectric element 60 to be described later, a protective substrate 330, a case member 340, and a wiring substrate 420.

The pressure chamber substrate 310 is formed of, for example, a silicon substrate, a glass substrate, an SOI substrate, various ceramic substrates, or the like. As illustrated in FIG. 3, on the pressure chamber substrate 310, two rows of pressure chambers in which a plurality of pressure chambers 312 are arranged along the Y axis are disposed along the X axis. In this case, of the two rows of the pressure chambers, a pressure chamber row located on the +X side may be referred to as a first pressure chamber row, and a pressure chamber row located on the −X side of the first pressure chamber may be referred to as a second pressure chamber row. Although FIG. 3 is a plan view of the print head 22 when viewed along the Z axis, illustrates a peripheral configuration of the pressure chamber substrate 310, and does not illustrate the protective substrate 330, the case member 340, and the like.

The plurality of pressure chambers 312 configuring each pressure chamber row are disposed on a straight line along the Y axis such that positions thereof along the X axis are the same position. The pressure chambers 312 located adjacent to each other along the Y axis are partitioned by a partition wall 311 illustrated in FIG. 6. Obviously, the arrangement of the pressure chamber 312 is not particularly limited, and for example, the arrangement of the plurality of pressure chambers 312 arranged along the Y axis may be a so-called staggered arrangement in which each pressure chamber 312 is located to be shifted every other one in the direction along the X axis.

The pressure chamber of the present embodiment 312 is formed in a so-called rectangular shape, for example, in which a length in the direction along the X axis is longer than a length in the direction along the Y axis in a plan view when viewed from the +Z side. Obviously, a shape of the pressure chamber 312 in a plan view from the +Z side is not limited to the rectangular shape, and may be a parallel quadrilateral shape, a polygonal shape, a circular shape, an oval shape, or the like. The oval shape referred to herein is a shape in which both end portions in a longitudinal direction are semicircular based on a rectangular shape, and includes a rounded rectangular shape, an elliptical shape, an egg shape, and the like.

As illustrated in FIG. 2, the communication plate 315, the nozzle plate 320, and the compliance substrate 345 are stacked on the +Z side of the pressure chamber substrate 310.

As illustrated in FIGS. 2, 4, and 5, the communication plate 315 is provided with a nozzle communication path 316 via which the pressure chamber 312 and the nozzle 321 communicate with each other. The communication plate 315 is provided with a first manifold portion 317 and a second manifold portion 318 that form a part of a manifold 400 serving as a common liquid chamber for communicating with the plurality of pressure chambers 312. The first manifold portion 317 is provided to penetrate the communication plate 315 in the direction along the Z axis. The second manifold portion 318 is provided to be open on the surface on the +Z side without penetrating the communication plate 315 in the direction along the Z axis.

The communication plate 315 is provided with a supply communication path 319, which communicates with one end portion of the pressure chamber 312 in the direction along the X axis, independently of each of the pressure chambers 312. The supply communication path 319 causes the second manifold portion 318 to communicate with each of the pressure chambers 312, and supplies the ink in the manifold 400 to each pressure chamber 312.

As the communication plate 315, a silicon substrate, a glass substrate, an SOI substrate, various ceramic substrates, a metal substrate, or the like may be used. In addition, examples of the metal substrate include a stainless steel substrate. It is preferable that the communication plate 315 is formed by using a material having a thermal expansion coefficient substantially the same as a thermal expansion coefficient of the pressure chamber substrate 310. As a result, even when the temperatures of the pressure chamber substrate 310 and the communication plate 315 change, it is possible to suppress the risk of warpage of the pressure chamber substrate 310 and the communication plate 315 due to a difference between the thermal expansion coefficients.

The nozzle plate 320 is provided on the surface the communication plate 315 opposite to the pressure chamber substrate 310, that is, on the surface on the +Z side. The nozzle plate 320 is provided with nozzles 321 communicating with the respective pressure chambers 312 via the nozzle communication paths 316.

In the present embodiment, the print head 22 includes a plurality of nozzles 321, and the plurality of nozzles 321 are arranged in parallel in the direction along the Y axis. Specifically, the nozzle plate 320 is provided with two nozzle rows in which the plurality of nozzles 321 are arranged while being spaced apart in the direction along the X axis. The two nozzle rows correspond to the first pressure chamber row and the second pressure chamber row, respectively. In addition, the plurality of nozzles 321 in each row are disposed such that the positions in the direction along the X axis are in the same position. The arrangement of the nozzles 321 is not particularly limited, and for example, the nozzles 321 arranged in parallel in the direction along the Y axis may be arranged at every other position shifted in the X axis direction.

The material of the nozzle plate 320 is not particularly limited, and for example, a silicon substrate, a glass substrate, an SOI substrate, various ceramic substrates, and a metal substrate can be used. In addition, examples of the metal substrate include a stainless steel substrate. Further, a material of the nozzle plate 320 may be an organic substance such as polyimide resin. However, it is preferable to use a material for the nozzle plate 320 that has substantially the same thermal expansion coefficient as the thermal expansion coefficient of the communication plate 315. As a result, even when the temperatures of the nozzle plate 320 and the communication plate 315 change, it is possible to suppress the risk of warpage of the nozzle plate 320 and the communication plate 315 due to a difference in the thermal expansion coefficient.

The compliance substrate 345 is provided together with the nozzle plate 320 on the surface of the communication plate 315 opposite to the pressure chamber substrate 310, that is, on the surface on the +Z side. The compliance substrate 345 is provided around the nozzle plate 320 and seals the openings of the first manifold portion 317 and the second manifold portion 318 provided in the communication plate 315. The compliance substrate 345 includes a sealing film 346 formed of a flexible thin film and a fixed substrate 347 made of a hard material such as metal. A region of the fixed substrate 347 facing the manifold 400 is an opening portion 348 completely removed in the thickness direction. Thus, one surface of the manifold 400 is a compliance portion 349 sealed only by the flexible sealing film 346.

On the other hand, on the surface of the pressure chamber substrate 310 on the opposite side to the nozzle plate 320 or the like, that is, on the surface on the −Z side, the vibration plate 350 and the piezoelectric element 60 that bends and deforms the vibration plate 350 to cause a pressure change in the ink inside the pressure chamber 312 are stacked. In other words, the vibration plate 350 is provided on the +Z side of the piezoelectric element 60 in the direction along the Z axis, and the pressure chamber substrate 310 is provided on the +Z side of the vibration plate 350 in the direction along the Z axis. FIG. 4 is a view for explaining the overall configuration of the print head 22, in which a configuration of the piezoelectric element 60 is illustrated in a simplified manner.

Moreover, the protective substrate 330 having substantially the same size as that of the pressure chamber substrate 310 is bonded to the surface of the pressure chamber substrate 310 on the −Z side via an adhesive or the like. The protective substrate 330 has a holding portion 331 that is a space for protecting the piezoelectric element 60. The holding portions 331 are spaces independently provided for each row of piezoelectric elements 60 arranged in parallel in the direction along the Y axis, and are formed two in parallel in the direction along the X axis. The protective substrate 330 is provided with a through-hole 332 formed therethrough in the direction along the Z axis between the two holding portions 331 disposed in parallel in the direction along the X axis.

The case member 340 for defining the manifold 400 communicating with the plurality of pressure chambers 312 together with the pressure chamber substrate 310 is fixed on the protective substrate 330. The case member 340 has substantially the same shape as that of the communication plate 315 described above in a plan view from the −Z side, and is bonded to the protective substrate 330 and is also bonded to the communication plate 315 described above.

Such a case member 340 has an accommodation portion 341 that is a space having a depth capable of accommodating the pressure chamber substrate 310 and the protective substrate 330 on the side of the protective substrate 330. The accommodation portion 341 has an opening area wider than the surface of the protective substrate 330 bonded to the pressure chamber substrate 310. The opening surface of the accommodation portion 341 on the side of the nozzle plate 320 is sealed by the communication plate 315 in a state in which the pressure chamber substrate 310 and the protective substrate 330 are accommodated in the accommodation portion 341.

Moreover, third manifold portions 342 are defined on each of both of the outsides of the accommodation portion 341, respectively, in the direction along the X axis of the case member 340. The manifold 400 is formed with the first manifold portion 317 and the second manifold portion 318 provided on the communication plate 315, and the third manifold portion 342. The manifold 400 is continuously provided in the direction along the Y axis, and the supply communication paths 319 through which each of the pressure chambers 312 and the manifold 400 communicate with each other are disposed in parallel in the direction along the Y axis.

The case member 340 is provided with a supply port 344 that communicates with the manifolds 400 to supply ink to each of the manifolds 400. Further, the case member 340 is provided with a coupling port 343 that communicates with the through-hole 332 of the protective substrate 330 and into which the wiring substrate 420 is inserted.

The print head 22 takes in the ink stored in the ink container 90 from the supply port 344. Then, after the inside from the manifold 400 to the nozzle 321 is filled with the ink, a signal based on the drive signal COM is supplied from the integrated circuit 421 to each piezoelectric element 60 corresponding to the pressure chamber 312. As a result, the vibration plate 350 is bent and deformed together with the piezoelectric element 60, the pressure in each pressure chamber 312 increases, and the ink is ejected from each nozzle 321.

Next, a configuration of the pressure chamber substrate 310 including the vibration plate 350 and the piezoelectric element 60 described above, which are stacked and formed at the −Z side, will be described. The print head 22 has an individual lead electrode 391, a common lead electrode 392, a measurement lead electrode 393, and resistance wiring 401 as constituents stacked on the −Z side of the pressure chamber substrate 310, in addition to the vibration plate 350 and the piezoelectric element 60.

As illustrated in FIGS. 4 to 6, the vibration plate 350 includes an elastic film 351, which is made of silicon oxide, provided on the side of the pressure chamber substrate 310, and an insulator film 352, which is made of a zirconium oxide film, provided on the elastic film 351. The liquid flow path of the pressure chamber 312 or the like is formed through anisotropic etching of the pressure chamber substrate 310 from the surface on the +Z side, and the surface of the liquid flow path of the pressure chamber 312 or the like on the −Z side is formed of the elastic film 351. The configuration of the vibration plate 350 is not particularly limited, and for example, may be formed with either the elastic film 351 or the insulator film 352, and may further include other films in addition to the elastic film 351 and the insulator film 352. Examples of the material of other films constituting the vibration plate 350 include silicon, silicon nitride, and the like.

The piezoelectric element 60 functions as a piezoelectric actuator that causes a pressure change in the ink in the pressure chamber 312. The piezoelectric element 60 has an electrode 360, a piezoelectric body 370, and an electrode 380 sequentially stacked from the +Z side that is the vibration plate 350 side toward the −Z side. In other words, the piezoelectric element 60 includes the electrode 360, the electrode 380, and the piezoelectric body 370, and the piezoelectric body 370 is provided between the electrode 360 and the electrode 380 in direction along the Z axis in which the electrode 360, the electrode 380, and the piezoelectric body 370 are stacked.

Both the electrode 360 and the electrode 380 are electrically coupled to the wiring substrate 420. The signal supplied from the integrated circuit 421 mounted on the wiring substrate 420 is supplied to the electrode 360, and the signal of a reference potential propagating through the wiring substrate 420 is supplied to the electrode 380, so that the signal supplied from the integrated circuit 421 and the signal of the reference potential are supplied to the piezoelectric body 370. Then, the piezoelectric body 370 is deformed by a potential difference generated between the electrode 360 and the electrode 380. Due to the deformation of the piezoelectric body 370, the vibration plate 350 is deformed or vibrated, and the volume of the pressure chamber 312 changes due to the deformation of the vibration plate 350. As the change in pressure generated due to the change in volume of the pressure chamber 312 is applied to the ink accommodated in the pressure chamber 312, the ink accommodated in the pressure chamber 312 is ejected from the nozzle 321 via the nozzle communication path 316. In this case, an ejection amount of the ink ejected from the nozzle 321 is an amount of change in volume of the pressure chamber 312.

In the following description, when the voltage is applied between the electrode 360 and the electrode 380 in the piezoelectric element 60, a portion where piezoelectric distortion occurs in the piezoelectric body 370 is referred to as an active portion 410, and a portion where piezoelectric distortion does not occur in the piezoelectric body 370 may be referred to as a non-active portion 415. That is, in the piezoelectric element 60, a portion where the piezoelectric body 370 is interposed between the electrode 360 and the electrode 380 corresponds to the active portion 410, and a portion where the piezoelectric body 370 is not interposed between the electrode 360 and the electrode 380 corresponds to the non-active portion 415. When the piezoelectric element 60 is driven, a portion that is displaced in the direction along the Z axis may be referred to as a flexible portion, and a portion that is not displaced in the direction along the Z axis is referred to as a non-flexible portion. That is, in the piezoelectric element 60, a portion that faces the pressure chamber 312 in the direction along the Z axis corresponds to a flexible portion, and a portion outside the pressure chamber 312 corresponds to the non-flexible portion. The active portion 410 may be referred to as a non-passive portion, and the non-active portion 415 may be referred to as a passive portion.

Generally, one electrode of the active portion 410 is configured as an independent individual electrode for each active portion 410, and the other electrode is configured as a common electrode common to a plurality of active portions 410. In the present embodiment, the description is made in which the electrode 360 to which the signal output by the integrated circuit 421 is supplied is configured as an individual electrode, and the electrode 380 to which the signal of the reference potential propagating through the wiring substrate 420 is supplied is configured as a common electrode.

Specifically, the electrode 360 is provided on the +Z side of the piezoelectric body 370, is separated for each pressure chamber 312, and configures an individual electrode that is independent for each active portion 410. The electrode 360 is individually provided for the plurality of pressure chambers 312. The electrode 360 is formed to have a width smaller than the width of the pressure chamber 312 in the direction along the Y axis. That is, an end portion of the electrode 360 is located inside the region facing the pressure chamber 312 in direction along the Y axis.

Further, an end portion 360*a* of the electrode 360 on the +X side and an end portion 360*b* thereof on the −X side are disposed outside the pressure chamber 312. For example, in the first pressure chamber row, as illustrated in FIG. 5, the end portion 360*a* of the electrode 360 is further disposed on the +X side then the end portion 312*a* of the pressure chamber 312 on the +X side. The end portion 360*b* of the electrode 360 is further disposed on the −X side than the end portion 312*b* of the pressure chamber 312 on the −X side.

A material of the electrode 360 is not particularly limited, and, for example, metals such as platinum (Pt), iridium (Ir), gold (Au), and titanium (Ti), and conductive materials including conductive metal oxides such as indium tin oxide abbreviated to ITO may be used. Alternatively, a plurality of materials such as platinum (Pt), iridium (Ir), gold (Au), and titanium (Ti) may be stacked and formed. In the present embodiment, platinum (Pt) is used as the electrode 360.

As illustrated in FIG. 3, the piezoelectric body 370 is continuously provided in the direction along the Y axis with a length in the direction along the X axis as a predetermined length. That is, the piezoelectric body 370 has a predetermined thickness and is continuously provided in the direction in which the pressure chambers 312 are arranged in parallel. A thickness of the piezoelectric body 370 is not particularly limited, and may be about 1000 nanometers to 4000 nanometers.

As illustrated in FIG. 5, a length of the piezoelectric body 370 in the direction along the X direction is larger than a length of the pressure chamber 312 in the direction along the X axis that is a longitudinal direction. Therefore, on both sides of the pressure chamber 312 in the direction along the X axis, the piezoelectric body 370 extends to the outside of the pressure chamber 312. As described above, the piezoelectric body 370 extends to the outside of the pressure chamber 312 in the direction along the X axis, and thus the strength of the vibration plate 350 is improved. Therefore, when the active portion 410 is driven to displace the piezoelectric element 60, it is possible to suppress the occurrence of cracks or the like in the vibration plate 350 or the piezoelectric element 60.

For example, as illustrated in FIG. 5, in the first pressure chamber row, an end portion 370*a* of the piezoelectric body 370 on the +X side is further located on the +X side that is an outer side compared to the end portion 360*a* of the electrode 360 in the first pressure chamber row. That is, the end portion 360*a* of the electrode 360 is covered with the piezoelectric body 370. On the other hand, the end portion 370*b* of the piezoelectric body 370 in the direction along the −X side is further located on the +X side that is an inner side compared to the end portion 360*b* of the electrode 360, and the end portion 360*b* of the electrode 360 is not covered with the piezoelectric body 370.

As illustrated in FIGS. 3 and 6, the piezoelectric body 370 is formed with a groove portion 371 to correspond to each of the partition walls 311 and having a thickness smaller than that of the other regions. The groove portion 371 of the present embodiment is formed by completely removing the piezoelectric body 370 in the direction along the Z axis. That is, the fact that the piezoelectric body 370 has a portion having a thickness smaller than other regions includes a case where the piezoelectric body 370 is completely removed in direction along the Z axis. Of course, the piezoelectric body

370 may be formed smaller than the other portions on a bottom surface of the groove portion 371.

The length of the groove portion 371 in direction along the Y axis, that is, a width of the groove portion 371 is the same as or larger than the width of the partition wall 311. In the present embodiment, the width of the groove portion 371 is larger than the width of the partition wall 311. Such groove portion 371 is formed to have a rectangular shape in plan view from the −Z side. Obviously, the shape of the groove portion 371 in plan view from the −Z side is not limited to the rectangular shape, and may be a polygonal shape of pentagon or more, a circular shape, an elliptical shape, or the like.

By providing the groove portion 371 in the piezoelectric body 370, the rigidity of the portion of the vibration plate 350 facing the end portion of the pressure chamber 312 in the direction along the Y axis, that is, a so-called arm portion of the vibration plate 350 is suppressed, and thus the piezoelectric element 60 can be favorably displaced.

Examples of the piezoelectric body 370 include a crystal film having a perovskite structure formed at the electrode 360 and made of a ferroelectric ceramic material exhibiting an electromechanical conversion action, that is, a so-called perovskite type crystal. As a material of the piezoelectric body 370, for example, a ferroelectric piezoelectric material such as lead zirconate titanate (PZT) or a material to which a metal oxide such as niobium oxide, nickel oxide, or magnesium oxide is added may be used. Specifically, lead titanate ($PbTiO_3$), lead zirconate titanate ($Pb(Zr, Ti) O_3$), lead zirconate ($PbZrO_3$), lead lanthanum titanate ($(Pb, La), TiO_3$), lead lanthanum zirconate titanate ($(Pb, La) (Zr, Ti) O_3$), lead magnesium niobate zirconate ($Pb(Zr, Ti) (Mg, Nb) O_3$), or the like may be used. In the present embodiment, lead zirconate titanate (PZT) is used as the piezoelectric body 370.

The material of the piezoelectric body 370 is not limited to a lead-based piezoelectric material containing lead, and a lead-free piezoelectric material containing no lead may also be used. Examples of the non-lead-based piezoelectric material include bismuth ferrite (($BiFeO_3$), abbreviated to "BFO"), barium titanate (($BaTiO_3$), abbreviated to "BT"), potassium sodium niobate ($(K, Na) (NbO_3)$, abbreviated to "KNN"), potassium sodium lithium niobate ($(K, Na, Li) (NbO_3)$), potassium sodium lithium tantalate niobate ($(K, Na, Li) (Nb, Ta)O_3$), bismuth potassium titanate ($(Bi_{1/2}K_{1/2}) TiO_3$, abbreviated to "BKT"), bismuth sodium titanate ($(Bi_{1/2}Na_{1/2}) TiO_3$, abbreviated to "BNT"), bismuth manganate ($BiMnO_3$, abbreviated to "BM"), a composite oxide containing bismuth, potassium, titanium, and iron and having a perovskite structure ($x[(Bi_xK_{1-x}) TiO_3]$-$(1-x) [BiFeO_3]$, abbreviated to "BKT-BF"), a composite oxide containing bismuth, iron, barium, and titanium and having a perovskite structure ($(1-x) [BiFeO_3]$-$x[BaTiO_3]$, abbreviated to "BFO-BT"), and a material ($(1-x) [Bi(Fe_{1-y}M_y) O_3]$-$x [BaTiO_3]$, M being Mn, Co, or Cr), which is obtained by adding metals such as manganese, cobalt, and chromium to the composite oxide.

As illustrated in FIGS. 3, 5, and 6, the electrode 380 is provided on the −Z side opposite to the electrode 360 with respect to the piezoelectric body 370, and is configured as a common electrode that is common to the plurality of active portions 410. That is, the electrode 380 is provided in common to the plurality of pressure chambers 312. The electrode 380 is continuously provided in the direction along the Y axis with a length in the direction along the X axis as a predetermined length. The electrode 380 is also provided on the inner surface of the groove portion 371, that is, on the side surface of the groove portion 371 of the piezoelectric body 370, and on the insulator film 352 which is the bottom surface of the groove portion 371. Regarding the inside of the groove portion 371, the electrode 380 may be provided only on a part of the inner surface of the groove portion 371, or does not need to be provided over the entire surface of the inner surface of the groove portion 371.

For example, as illustrated in FIG. 5, in the first pressure chamber row, an end portion **380*a* of the electrode 380 on the +X side is further disposed on the +X side so as to be the outside compared to the end portion 360*a* of the electrode 360 covered with the piezoelectric body 370. That is, the end portion 380*a* of the electrode 380 is further located on the +X side that is an outer side compared to the end portion 312*a* of the pressure chamber 312, and is further located on the +X side that is an outer side compared to the end portion 360*a* of the electrode 360. In the present embodiment, the end portion 380*a* of the electrode 380 substantially coincides with the end portion 370*a* of the piezoelectric body 370 in the direction along the X axis. Accordingly, the end portion of the active portion 410 on the +X side, that is, a boundary between the active portion 410 and the non-active portion 415 is defined by the end portion 360*a* of the electrode 360**.

On the other hand, an end portion **380*b* of the electrode 380 on the −X side is further disposed on the −X side that is an outer side compared to the end portion 312*b* of the pressure chamber 312 on the −X side, and is further disposed on the +X side that is an inner side compared to the end portion 370*b* of the piezoelectric body 370. As described above, the end portion 370*b* of the piezoelectric body 370 is further located on the inner side that is the +X side compared to the end portion 360*b* of the electrode 360. Therefore, the end portion 380*b* of the electrode 380 is further located on the piezoelectric body 370 that is the +X side compared to the end portion 360*b* of the electrode 360. There is a portion to which the surface of the piezoelectric body 370 is exposed on the end portion 380*b* of the electrode 380** on the −X side.

As described above, the end portion **380*b* of the electrode 380 is further disposed on the +X side compared to the end portion 370*b* of the piezoelectric body 370 and the end portion 360*b* of the electrode 360. Therefore, the end portion of the active portion 410 on the −X side, that is, the boundary between the active portion 410 and the non-active portion 415 is defined by the end portion 380*b* of the electrode 380**.

A material of the electrode 380 is not particularly limited, but, similar to the electrode 360, for example, metals such as platinum (Pt), iridium (Ir), gold (Au), and titanium (Ti), and conductive materials including conductive metal oxides such as indium tin oxide abbreviated to ITO may be used. Alternatively, a plurality of materials such as platinum (Pt), iridium (Ir), gold (Au), and titanium (Ti) may be stacked and formed. In the present embodiment, iridium (Ir) is used as the electrode 380.

On the outer side of the end portion **380*b* of the electrode 380, that is, further on the −X side of the end portion 380*b* of the electrode 380, a wiring portion 385 that is formed at the same layer as the electrode 380 but is electrically decoupled from the electrode 380 is provided. The wiring portion 385 is formed from above of the piezoelectric body 370 to above of the electrode 360 extending further to the −X side of the piezoelectric body 370 in a state in which the wiring portion 385 is spaced not to be in contact with the end portion 380*b* of the electrode 380. The wiring portion 385 is provided independently for each active portion 410. That is, a plurality of wiring portions 385 are disposed at predetermined intervals in the direction along the Y axis. The wiring portion 385 may be formed at a layer different from that of the electrode 380, but is preferably formed at the same layer as the electrode 380. As a result, manufacturing steps of the wiring portion 385** can be simplified and the cost can be reduced.

For the electrode 360 and the electrode 380 configuring the piezoelectric element 60, the individual lead electrode 391 is electrically coupled to the electrode 360 and the common lead electrode 392 that is a driving common electrode is electrically coupled to the electrode 380. The flexible wiring substrate 420 is electrically coupled to the end portions of the individual lead electrode 391 and the common lead electrode 392 on the opposite side to the end portions coupled to the piezoelectric element 60. The control unit 10, the temperature information output circuit 26, and a plurality of wiring for coupling to a plurality of circuits (not illustrated) are formed at the wiring substrate 420. In the present embodiment, the wiring substrate 420 is configured with, for example, a flexible printed circuit (FPC). Any flexible substrate such as flexible flat cable (FFC) may be used instead of an FPC.

In the present embodiment, the individual lead electrode 391 and the common lead electrode 392 extend to be exposed in the through-hole 332 formed in the protective substrate 330, and are electrically coupled to the wiring substrate 420 in the through-hole 332. In addition, the integrated circuit 421 that outputs a signal for driving the piezoelectric element 60 is mounted on the wiring substrate 420.

In the present embodiment, the individual lead electrode 391 and the common lead electrode 392 are formed at the same layer, but are formed to be electrically decoupled from each other. As a result, manufacturing steps can be simplified and the cost can be reduced compared with when the individual lead electrode 391 and the common lead electrode 392 are individually formed. Obviously, the individual lead electrode 391 and the common lead electrode 392 may be formed at different layers.

A material of the individual lead electrode 391 and the common lead electrode 392 is not particularly limited as long as the material is conductive. For example, gold (Au), copper (Cu), titanium (Ti), tungsten (W), nickel (Ni), chromium (Cr), platinum (Pt), aluminum (Al), and the like may be used. In the present embodiment, gold (Au) is used as the individual lead electrode 391 and the common lead electrode 392. The individual lead electrode 391 and the common lead electrode 392 may have an adhesion layer for improving the adhesion with the electrode 360, the electrode 380, and the vibration plate 350.

The individual lead electrode 391 is provided for each active portion 410, that is, for each electrode 360. As illustrated in FIG. 5, for example, in the first pressure chamber row, the individual lead electrode 391 is coupled to the vicinity of the end portion 360*b* of the electrode 360 provided on the outside of the piezoelectric body 370 via the wiring portion 385, and is drawn out to the −X side to above of the pressure chamber substrate 310 and actually to above of the vibration plate 350.

On the other hand, as illustrated in FIG. 3, for example, in the first pressure chamber row, the common lead electrode 392 is drawn out to the −X side from above of the electrode 380 constituting the common electrode on the piezoelectric body 370 to above of the vibration plate 350, at both end portions in the direction along the Y axis. The common lead electrode 392 has an extension portion 392*a* and an extension portion 392*b*. As illustrated in FIGS. 3 and 5, for example, in the first pressure chamber row, the extension portion 392*a* extends in the direction along the Y axis in a region corresponding to the end portion 312*a* of the pressure chamber 312, and the extension portion 392*b* extends in the direction along the Y axis to a region corresponding to the end portion 312*b* of the pressure chamber 312. The extension portion 392*a* and the extension portion 392*b* are continuously provided on the plurality of active portions 410 in the direction along the Y axis.

The extension portion 392*a* and the extension portion 392*b* extend from the inside of the pressure chamber 312 to the outside of the pressure chamber 312 in the direction along the X axis. In the present embodiment, the active portion 410 of the piezoelectric element 60 extends to the outside of the pressure chamber 312 at both end portions of the pressure chamber 312 in the direction along the X axis, and the extension portion 392*a* and the extension portion 392*b* extend to the outside of the pressure chamber 312 on the active portion 410.

As illustrated in FIG. 5, the resistance wiring 401 is provided on the surface of the vibration plate 350 on the −Z side. The resistance wiring 401 detects the temperature of the pressure chamber 312 by using the characteristic that an electrical resistance value changes depending on the temperature. As a material of the resistance wiring 401, a material having an electrical resistance value that is temperature dependent is used, for example, gold (Au), platinum (Pt), iridium (Ir), aluminum (Al), copper (Cu), titanium (Ti), tungsten (W), nickel (Ni), and chromium (Cr) may be used. Among these, platinum (Pt) has a large change in resistance value due to temperature, and has high stability and accuracy. Furthermore, platinum (Pt) also has high linearity of the change in resistance value depending on the temperature change. From this viewpoint, platinum (Pt) is preferably used as the material of the resistance wiring 401. That is, the resistance wiring 401 preferably include platinum (Pt). In addition, in the present embodiment, the resistance wiring 401 is stacked and formed at the surface of the vibration plate 350 on the −Z side so as to be the same layer with the electrode 360 and electrically decoupled to the electrode 360. That is, the resistance wiring 401 includes a wiring pattern stacked on the surface of the −Z side of the vibration plate 350 in the direction along the Z axis, and the wiring pattern includes platinum (Pt).

As illustrated in FIG. 3, one end of the resistance wiring 401 is coupled to a measurement lead electrode 393*a*, and the other end of the resistance wiring 401 is coupled to a measurement lead electrode 393*b*. The measurement lead electrodes 393*a* and 393*b* are electrically coupled to the wiring substrate 420. As a result, the signal of the voltage value according to the electrical resistance value that changes with the temperature of the pressure chamber 312, which is the temperature of the pressure chamber 312 detected by the resistance wiring 401, is output from the print head 22. In the present embodiment, the resistance wiring 401 is covered with the piezoelectric body 370, and is located between the vibration plate 350 and the piezoelectric body 370 in a direction along the Z axis.

The resistance wiring 401 includes a first pressure chamber row side meandering pattern located on the +X side in the direction along the X axis and a second pressure chamber row side meandering pattern located on the −X side in the direction along the X axis. The first pressure chamber row side meandering pattern meanders in the direction along the Y axis at a position overlapping the supply communication path 319 communicating with each pressure chamber 312 constituting the first pressure chamber row when viewed from −Z side. The second pressure chamber row side meandering pattern meanders in the direction along the Y axis at a position overlapping the supply communication path 319 communicating with each pressure chamber 312 constituting the second pressure chamber row when viewed from the −Z side. That is, the resistance wiring 401 has the first pressure chamber row side meandering pattern corresponding to the first pressure chamber row formed by the plurality of pressure chambers 312 and the second pressure chamber row side meandering pattern corresponding to the second pressure chamber row formed by the plurality of pressure chambers 312.

As illustrated in FIGS. 4 and 5, a distance between the end portion of the pressure chamber 312 on the −Z side and the resistance wiring 401 in the direction along the Z axis is smaller than a dimension of the pressure chamber 312 in the direction along the Z axis. For example, in the first pressure chamber row, the longest distance in the direction along the X axis between the end portion 312*a* of the pressure chamber 312 on the +X side and the resistance wiring 401 is smaller than the dimension of the pressure chamber 312 in the direction along the X axis. Therefore, the electrical resistance value of the resistance wiring 401 is likely to change in response to a temperature change of the pressure chamber 312.

In the present embodiment, the measurement lead electrode 393 including the measurement lead electrode 393*a* and the measurement lead electrode 393*b* is formed at the same layer as the individual lead electrode 391 and the common lead electrode 392, but is electrically decoupled. As a result, manufacturing steps can be simplified and the cost can be reduced compared with when the measurement lead electrode 393 is individually formed with the individual lead electrode 391 and the common lead electrode 392. Of course, the measurement lead electrode 393 may be formed at a layer different from the individual lead electrode 391 and the common lead electrode 392.

A material of the measurement lead electrode 393 is not particularly limited as long as the material is conductive. For example, gold (Au), copper (Cu), titanium (Ti), tungsten (W), nickel (Ni), chromium (Cr), platinum (Pt), and aluminum (Al) may be used. In the present embodiment, gold (Au) is used as the measurement lead electrode 393. A material of the measurement lead electrode 393 is the same as the material of the individual lead electrode 391 and the common lead electrode 392. The measurement lead electrode 393 may have an adhesion layer that improves adhesion to the resistance wiring 401 and the vibration plate 350.

As described above, in the present embodiment, the measurement lead electrode 393 extends to be exposed in the through-hole 332 formed in the protective substrate 330, and is electrically coupled to the wiring substrate 420 in the through-hole 332. As a result, the electrical resistance value of the resistance wiring 401, which is changed depending on the temperature of the pressure chamber 312, is output from the print head 22 via the wiring substrate 420.

That is, the print head 22 of the head unit 20 in the present embodiment includes: the piezoelectric element 60 including the electrode 360, the electrode 380, and the piezoelectric body 370, having the piezoelectric body 370 that is located between the electrode 360 and the electrode 380 in the direction along the Z axis in which the electrode 360, the electrode 380, and the piezoelectric body 370 are stacked, and driven by receiving the drive signal COM; the vibration plate 350 located on the +Z side that is one side of the piezoelectric element 60 in the direction along the Z axis, and deformed by the drive of the piezoelectric element 60; the pressure chamber substrate 310 located on the +Z side that is one side of the vibration plate 350 in the direction along the Z axis, and provided with the pressure chamber 312 having a voltage that changes due to the deformation of the vibration plate 350; the nozzle 321 for ejecting the ink according to the change in volume of the pressure chamber 312; and the resistance wiring 401 located on the −Z side that is the other side of the vibration plate 350 in the direction along the Z axis, to acquire a temperature according to the temperature of the pressure chamber 312.

Figure 7:
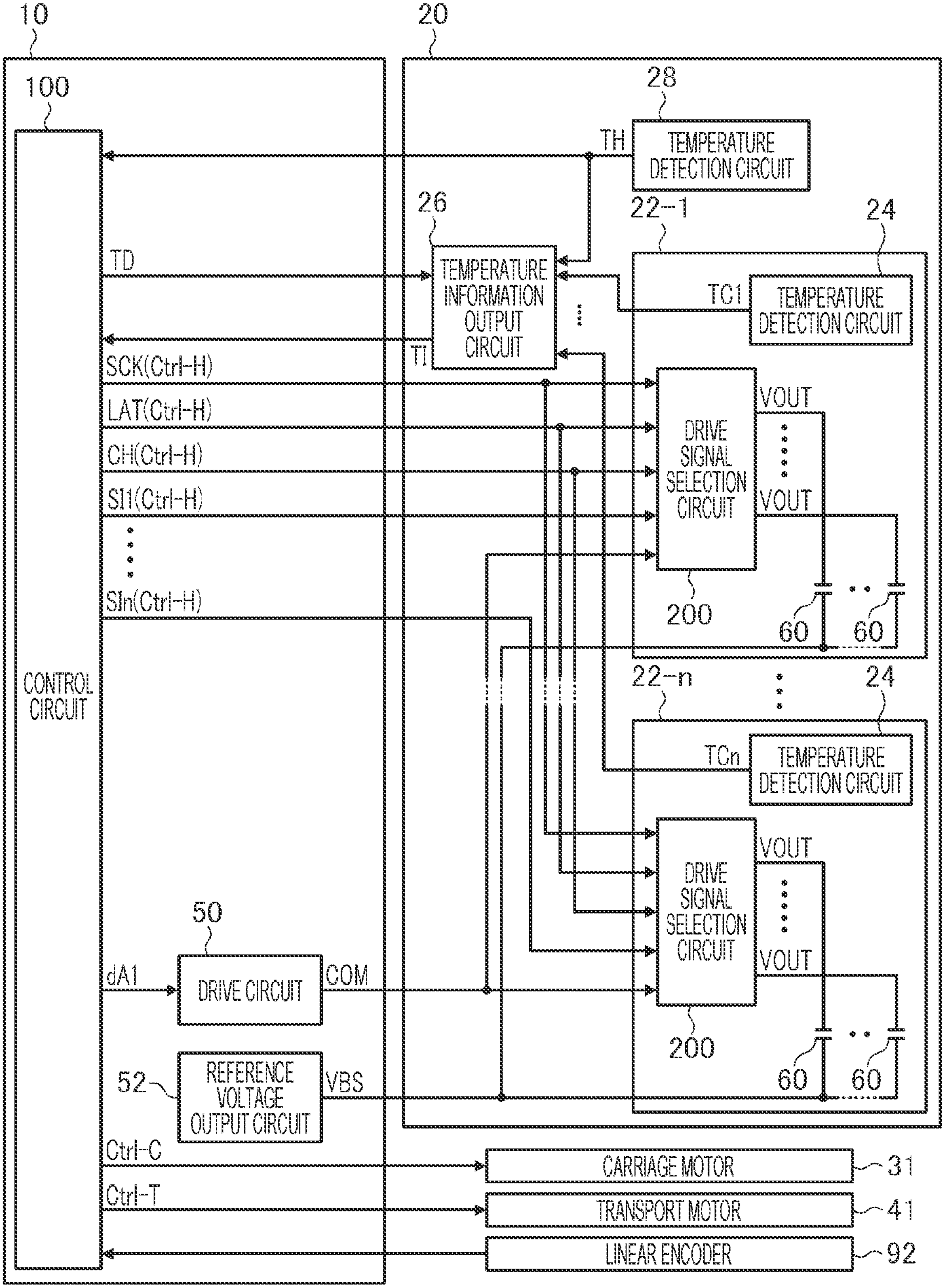
FIG. 7 is a diagram illustrating a functional configuration of the liquid ejecting apparatus.

2. Functional Configuration of Liquid Ejecting Apparatus Functional Configuration of Liquid Ejecting Apparatus Next, a functional configuration of the liquid ejecting apparatus 1 will be described. FIG. 7 is a diagram illustrating a functional configuration of the liquid ejecting apparatus 1. As illustrated in FIG. 7, the liquid ejecting apparatus 1 includes the control unit 10, the head unit 20, the carriage motor 31, the transport motor 41, and a linear encoder 92.

The control unit 10 includes a drive circuit 50, a reference voltage output circuit 52, and a control circuit 100. For example, the control circuit 100 includes a processing circuit such as a CPU and an FPGA and a storage circuit such as a semiconductor memory. An image information signal including image data or the like is input to the control circuit 100 from an external device such as a host computer that is communicatively coupled to the outside of the liquid ejecting apparatus 1. The control circuit 100 generates various signals for controlling the liquid ejecting apparatus 1 based on the input image information signal, and outputs the various signals to corresponding configurations.

As a specific example, in addition to the image information signal described above, a detection signal based on a scanning position of the above-described carriage 21 of the head unit 20 is input from the linear encoder 92 to the control circuit 100. As a result, the control circuit 100 grasps a scanning position of the head unit 20 including the print head 22, which is the scanning position of the carriage 21. The control circuit 100 generates various signals according to the input image information signal and the grasped scanning position of the head unit 20, and outputs the signals to the corresponding configurations.

Specifically, the control circuit 100 generates a control signal Ctrl-C for controlling movement of the head unit 20 along a scanning axis according to the scanning position of the head unit 20, and outputs the control signal Ctrl-C to the carriage motor 31. As a result, the carriage motor 31 is operated, and movement of the head unit 20 mounted on the carriage 21 along the scanning axis and a scanning position thereof are controlled. The control circuit 100 generates the control signal Ctrl-T for controlling transport of the medium P, and outputs the control signal Ctrl-T to the transport motor 41. As a result, the transport motor 41 is operated, and movement of the medium P in the transport direction is controlled. The control signal Ctrl-C may be input to the carriage motor 31 after being signal-converted via a driver circuit (not illustrated), and the control signal Ctrl-T may be input to the transport motor 41 after being signal-converted via a driver circuit (not illustrated).

Moreover, the control circuit 100 generates print data signals SI1 to SIn, a change signal CH, a latch signal LAT, and a clock signal SCK as the control signal Ctrl-H for controlling the head unit 20 based on the image information signal input from the external device and the scanning position of the head unit 20, and outputs the print data signals SI1 to SIn, the change signal CH, the latch signal LAT, and the clock signal SCK to the head unit 20. Furthermore, the control circuit 100 generates a temperature acquisition request signal TD for acquiring the temperature of the head unit 20 at a predetermined timing, and outputs the temperature acquisition request signal TD to the head unit 20. In this case, the temperature information signal TI including the temperature of the head unit 20 according to the temperature acquisition request signal TD is input to the control circuit 100. The control circuit 100 grasps a state of the head unit 20 and corrects the control signals Ctrl-H, Ctrl-C, and Ctrl-T based on the input temperature information signal TI, and outputs the corrected control signals Ctrl-H, Ctrl-C, and Ctrl-T to the corresponding configurations. Accordingly, the operations of the liquid ejecting apparatus 1 and the head unit 20 are controlled in accordance with the temperature information signal TI, which is the temperature of the print head 22. As a result, the ejection accuracy of the ink ejected from the liquid ejecting apparatus 1 and the head unit 20 is improved.

Moreover, the control circuit 100 generates a reference drive signal dA1 that is a digital signal and outputs the reference drive signal dA1 to the drive circuit 50 as the control signal Ctrl-H. The drive circuit 50 generates a drive signal COM having a signal waveform defined by the reference drive signal dA1 as the drive signal COM, and outputs the drive signal COM to the head unit 20.

Specifically, the reference drive signal dA1 output by the control circuit 100 is input to the drive circuit 50. The drive circuit 50 converts the input reference drive signal dA1 into a digital/analog signal, and then performs class D amplification on the converted analog signal to generate a drive signal COM and output the drive signal COM to the head unit 20. That is, the control circuit 100 outputs the reference drive signal dA1 as the control signal Ctrl-H corrected based on the temperature information signal TI, and the drive circuit 50 outputs the drive signal COM corrected according to the reference drive signal dA1 corrected based on the temperature information signal TI. In this case, the reference drive signal dA1 output by the control circuit 100 is described as a digital signal that defines a signal waveform of the drive signal COM, but the reference drive signal dA1 may define the signal waveform of the drive signal COM or may be an analog signal. In addition, the drive circuit 50 may perform class A amplification, class B amplification, and class AB amplification on the signal waveform defined by the reference drive signal dA1 to generate the drive signal COM.

The reference voltage output circuit 52 generates a reference voltage signal VBS and outputs the reference voltage signal VBS to the head unit 20. The reference voltage signal VBS is a signal having a constant voltage value as a reference for driving the piezoelectric element 60, and is supplied to the electrode 380 that is a common electrode. The voltage value of such a reference voltage signal VBS may be, for example, a constant signal at a ground potential, or may be constant at a potential of 5.5 V, 6 V, or the like.

The head unit 20 includes the print heads 22-1 to 22-*n* as the plurality of print heads 22, the temperature information output circuit 26, and the temperature detection circuit 28. In addition, each of the print heads 22-1 to 22-*n* includes the drive signal selection circuit 200, the temperature detection circuit 24, and a plurality of piezoelectric elements 60.

The print data signal SI1, the change signal CH, the latch signal LAT, the clock signal SCK, the drive signal COM, and the reference voltage signal VBS, which are output by the control circuit 100, are input to the print head 22-1. The clock signal SCK, the latch signal LAT, the change signal CH, the print data signal SI1, and the drive signal COM, which are input to the print head 22-1, are input to each of the drive signal selection circuits 200. The drive signal selection circuit 200 selects or does not select a signal waveform of the drive signal COM based on the input clock signal SCK, latch signal LAT, change signal CH, and print data signal SI1, so that a drive signal VOUT corresponding to each of the plurality of piezoelectric elements 60 is generated. Then, the drive signal selection circuit 200 outputs the generated drive signal VOUT to each electrode 360 that is an individual electrode, which is one end of each corresponding piezoelectric element 60. In addition, the reference voltage signal VBS is commonly input to the electrode 380 that is the other end of the plurality of piezoelectric elements 60 and is a common electrode. Then, each of the plurality of piezoelectric elements 60 is displaced by a potential difference between the drive signal VOUT input to the electrode 360 and the reference voltage signal VBS input to the electrode 380. As a result, an amount of ink, corresponding to the displacement of the piezoelectric element 60, is ejected from the corresponding nozzle 321 of the print head 22-1. In this case, at least a part of the drive signal selection circuit 200 of the print head 22-1 is mounted on the wiring substrate 420 of the print head 22-1 as the integrated circuit 421 described above.

Further, the temperature detection circuit 24 of the print head 22-1 detects the temperature of the print head 22-1. Then, the temperature detection circuit 24 acquires head temperature information tc1 of the voltage value according to the detected temperature of the print head 22-1, and outputs the head temperature signal TC1 including the acquired head temperature information tc1 to the temperature information output circuit 26. In this case, at least a part of the temperature detection circuit 24 of the print head 22-1 is provided on the print head 22-1 as the resistance wiring 401 described above. That is, the head temperature information tc1 of the voltage value according to the temperature of the print head 22-1 output by the temperature detection circuit 24 includes information about the voltage value that changes depending on the resistance value of the resistance wiring 401 that changes due to the temperature.

Moreover, the print heads 22-2 to 22-*n* have the same configuration as the print head 22-1 except that the input signals and the output signals are different, and perform the same operation. Specifically, the clock signal SCK, the latch signal LAT, the change signal CH, the print data signal SIi, the drive signal COM, and the reference voltage signal VBS are input to the print head 22-*i* (i is any of 2 to n). Then, the drive signal selection circuit 200 of the print head 22-*i* selects or does not select the signal waveform of the drive signal COM based on the input clock signal SCK, latch signal LAT, change signal CH, and print data signal SIi, to generate the drive signal VOUT corresponding to each of the plurality of the piezoelectric element 60 and output the drive signal VOUT to the electrode 360 of the corresponding piezoelectric element 60. In addition, the reference voltage signal VBS is commonly input to the electrode 380 of the plurality of piezoelectric elements 60 of the print head 22-*i*. Therefore, the plurality of piezoelectric elements 60 of the print head 22-*i* are driven, and an amount of ink corresponding to the drive of the piezoelectric element 60 is ejected from the nozzle 321 of the print head 22-*i*. Moreover, the temperature detection circuit 24 of the print head 22-*i* acquires head temperature information tci of the voltage value in response to the temperature of the print head 22-*i*, and outputs a head temperature signal TCi including the acquired head temperature information tci to the temperature information output circuit 26. In this case, at least a part of the drive signal selection circuit 200 of the print head 22-*i* is mounted on the wiring substrate 420 of the print head 22-*i* as the integrated circuit 421 described above, and at least a part of the temperature detection circuit 24 of the print head 22-*i* is provided on the print head 22-*i* as the resistance wiring 401 described above.

In the following description, when it is not necessary to distinguish the print heads 22-1 to 22-*n*, the description is made in which the clock signal SCK, the latch signal LAT, the change signal CH, the print data signal SI serving as the print data signals SI1 to SIn, the drive signal COM, and the reference voltage signal VBS are input to the print head 22. Then, the description is made in which the temperature detection circuit 24 of the print head 22 acquires the head temperature information tc as the head temperature information tc1 to tcn of the voltage value in response to the temperature of the print head 22, and the print head 22 outputs the head temperature signal TC as the head temperature signals TC1 to TCn including the acquired head temperature information tc.

The temperature detection circuit 28 detects the temperature of the head unit 20 including the print heads 22-1 to 22-*n*. Then, the temperature detection circuit 28 generates a unit temperature signal TH including unit temperature information th of a voltage value according to the detected temperature. The temperature detection circuit 28 outputs the generated unit temperature signal TH to the temperature information output circuit 26 and the control circuit 100. The temperature detection circuit 28 includes a thermistor element or the like of which a resistance value changes in response to a change in the temperature of the head unit 20.

The head temperature signals TC1 to TCn output by each of the print heads 22-1 to 22-*n*, the unit temperature signal TH output by the temperature detection circuit 28, and the temperature acquisition request signal TD output by the control circuit 100 are input to the temperature information output circuit 26.

The temperature information output circuit 26 corrects and amplifies the head temperature signals TC1 to TCn based on the unit temperature information th of the unit temperature signal TH. Thereafter, the temperature information output circuit 26 outputs a signal based on the head temperature information tc1 to tcn according to the temperature acquisition request signal TD input from the control circuit 100 to the control circuit 100 as the temperature information signal TI. The specific example of the configuration and the operation of the temperature information output circuit 26 will be described later.

As described above, in the liquid ejecting apparatus 1 of the present embodiment, the control circuit 100 outputs the control signal Ctrl-H, which includes the clock signal SCK, the latch signal LAT, the change signal CH, and the print data signal SI, corrected based on the temperature information signal TI, and the drive circuit 50 outputs the drive signal COM corrected based on the temperature information signal TI. In addition, the head unit 20 ejects the ink by receiving the control signal Ctrl-H and the drive signal COM. In addition, the head unit 20 also includes the print heads 22-1 to 22-*n* that eject the ink by receiving the drive signal COM, and the temperature information output circuit 26 that outputs the temperature information signal TI indicating the temperatures of the print heads 22-1 to 22-*n*.

Signal Waveform of Drive Signal COM and Functional Configuration of Drive Signal Selection Circuit Next, the configuration and operation of the drive signal selection circuit 200 of the print head 22 will be described. As described above, the drive signal selection circuit 200 of the print head 22 selects or does not select the signal waveform of the drive signal COM based on the clock signal SCK, the print data signal SI, the latch signal LAT, and the change signal CH to generate the drive signal VOUT and output the drive signal VOUT to the corresponding piezoelectric element 60. Then, in describing the configuration and operation of the drive signal selection circuit 200, an example of a waveform of the drive signal COM input to the drive signal selection circuit 200 will be first described.

Figure 8:
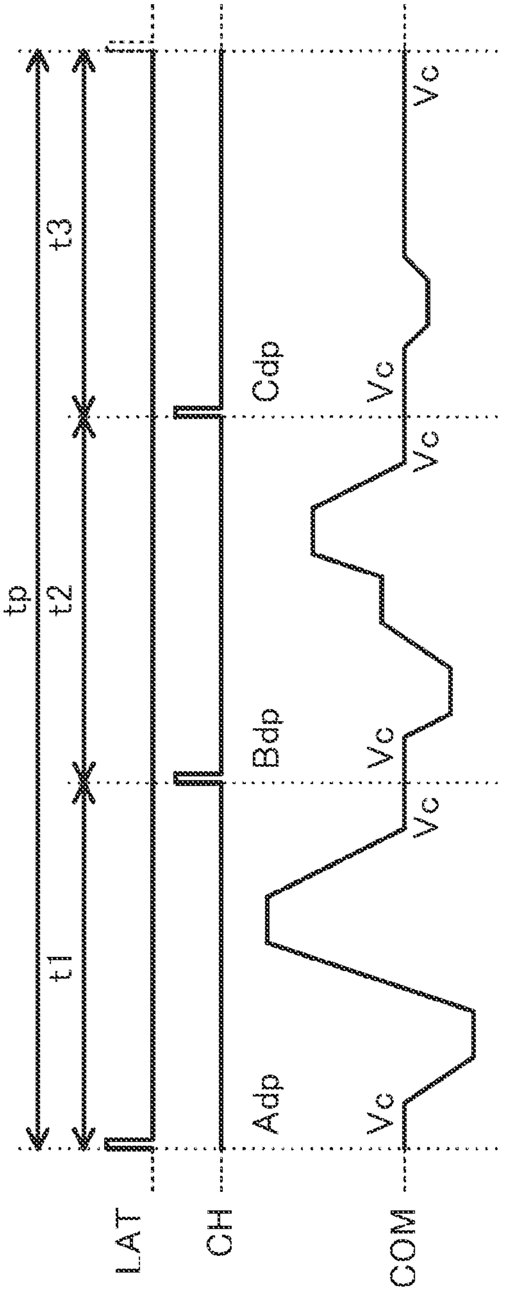
FIG. 8 is a diagram illustrating an example of a signal waveform of a drive signal.

FIG. 8 is a graph illustrating an example of the signal waveform of the drive signal COM. As illustrated in FIG. 8, the drive signal COM includes a trapezoidal waveform Adp disposed within the period t1 after the latch signal LAT rises until the change signal CH rises, a trapezoidal waveform Bdp disposed within the period t2 after the change signal CH rises until the next change signal CH rises, and a trapezoidal waveform Cdp disposed within the period t3 after the change signal CH rises until the latch signal LAT rises. The trapezoidal waveform Adp is a signal waveform that drives the piezoelectric element 60 so as to eject a predetermined amount of ink, the trapezoidal waveform Bdp is a signal waveform that drives the piezoelectric element 60 so as to eject an amount of ink smaller than the predetermined amount, and the trapezoidal waveform Cdp is a signal waveform that drives the piezoelectric element 60 to such an extent that the ink is not ejected. In this case, when the trapezoidal waveform Cdp is supplied to the piezoelectric element 60, the piezoelectric element 60 is a signal waveform for reducing the possibility of increase in ink viscosity near the nozzle opening portion by vibrating ink near the corresponding nozzle opening portion.

Further, the trapezoidal waveforms Adp, Bdp and Cdp are signal waveforms in which voltage values at respective start timing and end timing are common to a voltage Vc. In other words, each of the trapezoidal waveforms Adp, Bdp, and Cdp starts at the voltage Vc and ends at the voltage Vc.

In the following description, when the trapezoidal waveform Adp is supplied to the piezoelectric element 60, an amount of the predetermined amount of ink to be ejected may be referred to as a medium amount, and when the trapezoidal waveform Bdp is supplied to the piezoelectric element 60, an amount of the ink that is smaller than a predetermined amount to be ejected may be referred to as a small amount. Further, when the trapezoidal waveform Cdp is supplied to the piezoelectric element 60, the operation for vibrating the ink in the vicinity of the nozzle opening portion corresponding to the piezoelectric element 60 to prevent the ink viscosity from increasing may be referred to as microvibration. The signal waveform of the drive signal COM illustrated in FIG. 8 is an example, and the present disclosure is not limited thereto. The signal waveform of the drive signal COM may use a combination of various waveforms according to the materials of the ink being ejected, the material of the medium P where the ink lands, and the like.

The drive signal selection circuit 200 selects or does not select the trapezoidal waveforms Adp, Bdp, and Cdp of the drive signal COM in a cycle tp including the periods t1, t2, and t3. Accordingly, the drive signal selection circuit 200 controls the ejection amount of the ink ejected from each of the plurality of nozzles 321 in the cycle tp. That is, the drive signal selection circuit 200 controls a dot size formed at the medium P in the cycle tp. In the cycle tp including the periods t1, t2, and t3, dots having a predetermined size are formed at the medium P. The cycle tp in which the dots of the predetermined size are formed corresponds to the dot formation cycle.

Figure 9:
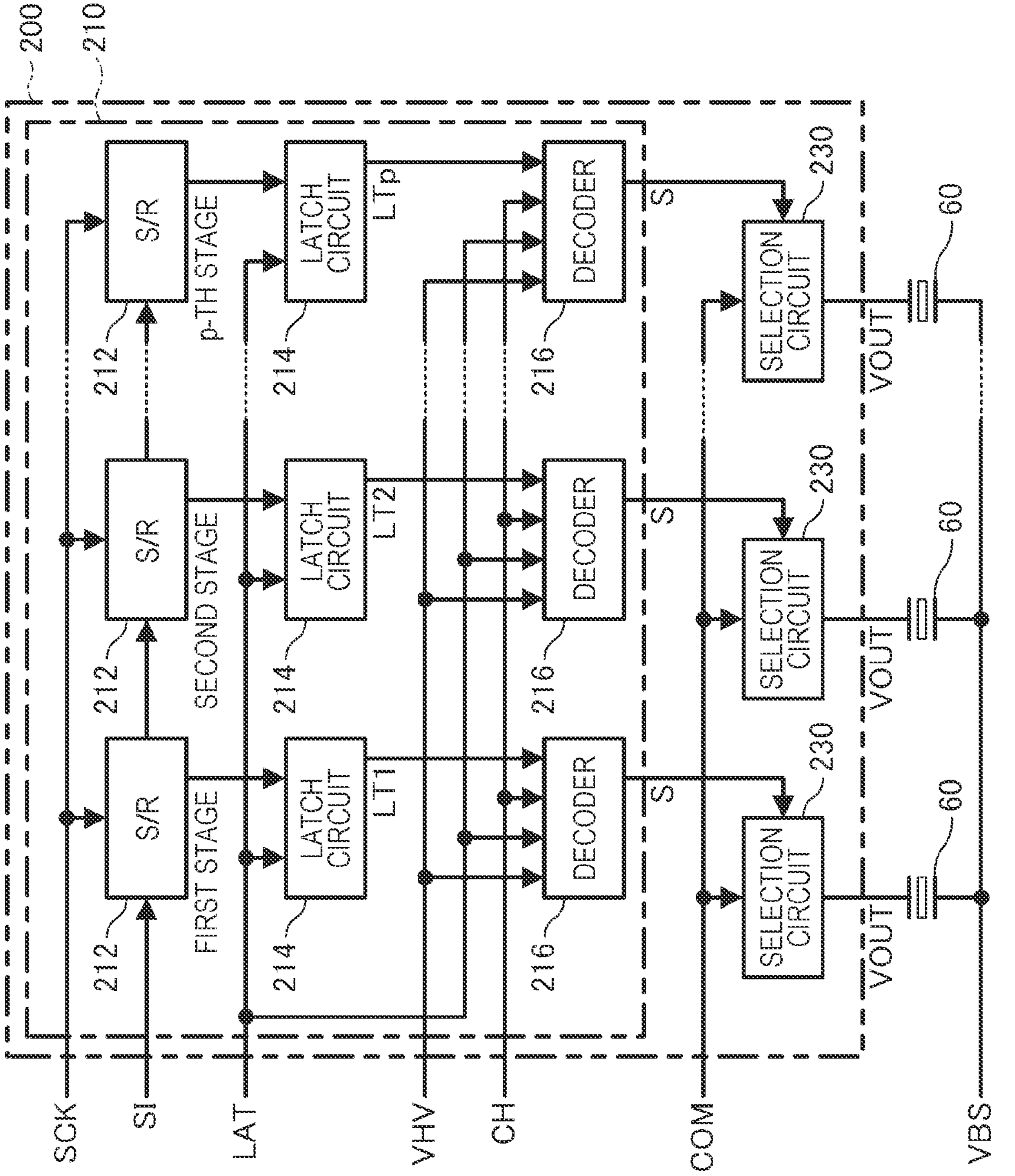
FIG. 9 is a diagram illustrating a configuration of a drive signal selection circuit.

Next, the configuration and operation of the drive signal selection circuit 200 that generates the drive signal VOUT by selecting or not selecting the signal waveform included in the drive signal COM will be described. FIG. 9 is a diagram illustrating a configuration of the drive signal selection circuit 200. As illustrated in FIG. 9, the drive signal selection circuit 200 includes a selection control circuit 210 and a plurality of selection circuits 230 having the same number as the plurality of piezoelectric elements 60. In the following description, the description is made in which the print head 22 includes p piezoelectric elements 60. That is, the drive signal selection circuit 200 includes p selection circuits 230.

The clock signal SCK, the print data signal SI, the latch signal LAT, and the change signal CH are input to the selection control circuit 210. In addition, in the selection control circuit 210, a set of a shift register (S/R) 212, a latch circuit 214, and a decoder 216 is provided corresponding to each of the p piezoelectric elements 60. That is, the drive signal selection circuit 200 includes p shift registers 212, p latch circuits 214, and p decoders 216.

The print data signal SI is input to the selection control circuit 210 in synchronization with the clock signal SCK. The print data signals SI are 2-bit print data [SIH, SIL] for selecting one of “large dot LD”, “medium dot MD”, “small dot SD”, and “non-recording ND”, serially corresponding to each of the p piezoelectric elements 60. The print data [SIH, SIL] included in the print data signal SI is held in the p shift registers 212 that corresponds to the p piezoelectric elements 60. Specifically, p shift registers 212 corresponding to the piezoelectric element 60 are coupled in cascade to each other, and the serially input print data signal SI is sequentially transferred to the subsequent shift register 212 according to the clock signal SCK. When the print data [SIH, SIL] is held in the corresponding shift register 212, the clock signal SCK is stopped. Accordingly, the print data [SIH, SIL] of the print data signal SI is held in the corresponding shift registers 212. In FIG. 9, in order to distinguish the p shift registers 212 from each other, the shift registers 212 are denoted as a first stage, a second stage, . . . , p-th stage in order from the upstream to which the print data signal SI is input.

Figures 10, 11:
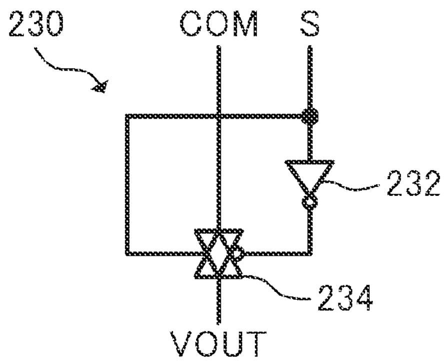
FIG. 10 is a diagram illustrating table contents in a decoder.
FIG. 11 is a diagram illustrating a configuration of a selection circuit.

Each of the p latch circuits 214 latches simultaneously the print data [SIH, SIL] held in the corresponding shift register 212 at the rise of the latch signal LAT. The print data [SIH, SIL] latched by the latch circuit 214 is input to the corresponding decoder 216. FIG. 10 is a diagram illustrating an example of decoding contents in the decoder 216. The decoder 216 outputs a selection signal S of a logic level that is defined by the input print data [SIH, SIL] within each of the periods t1, t2, and t3. For example, when the print data [SIH, SIL]=[1, 0] is input to the decoder 216, the decoder 216 outputs the logic levels of the selection signal S as H, L, and L levels within the periods t1, t2, and t3.

The selection signal S output by the decoder 216 is input to the selection circuit 230. The selection circuit 230 is provided corresponding to each of p piezoelectric elements 60. In other words, the drive signal selection circuit 200 has p selection circuits 230 that are the same in number as the p piezoelectric elements 60. FIG. 11 is a diagram illustrating a configuration of the selection circuit 230. As illustrated in FIG. 11, the selection circuit 230 includes an inverter 232 which is NOT circuit and a transfer gate 234.

The selection signal S is input to a positive control end not marked with a circle in the transfer gate 234, and is also input to the negative control end marked with a circle in the transfer gate 234 after the logic level is inverted by the inverter 232. In addition, the drive signal COM is supplied to the input end of the transfer gate 234. When the selection signal S at the high level is input, the transfer gate 234 is conductive between the input end and the output end, and when the selection signal S at the low level is input, the transfer gate 234 is non-conductive between the input end and the output end. That is, the transfer gate 234 outputs a signal waveform of the drive signal COM from the output end when the logic level of the selection signal S is the high level, and does not output a signal waveform of the drive signal COM from the output end when the logic level of the selection signal S is the low level. The drive signal selection circuit 200 outputs a signal output to the output end of the transfer gate 234 of the selection circuit 230 as the drive signal VOUT.

Figure 12:
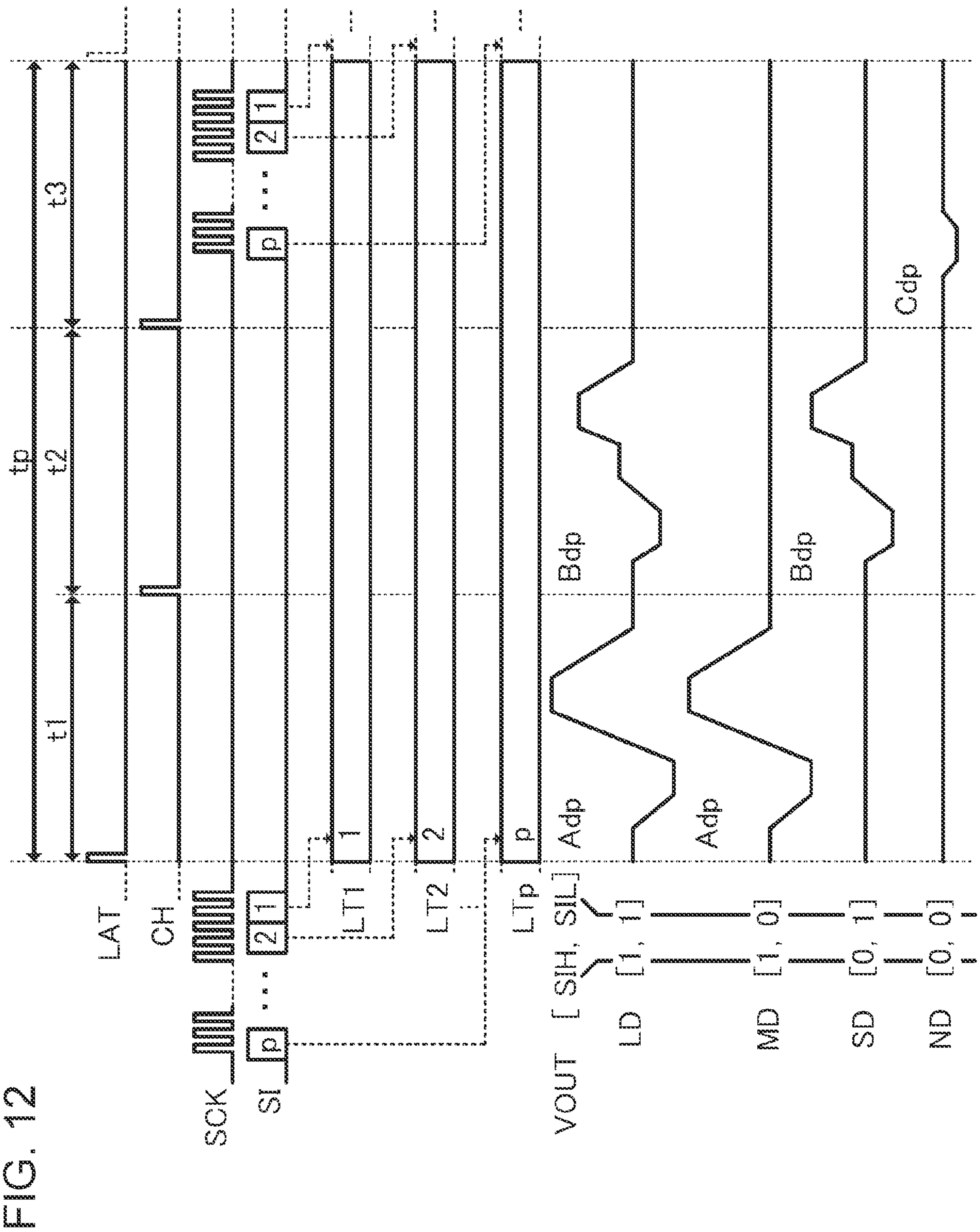
FIG. 12 is a diagram for explaining an operation of the drive signal selection circuit.

The operation of the drive signal selection circuit 200 will be described with reference to FIG. 12. FIG. 12 is a diagram for explaining the operation of the drive signal selection circuit 200. The print data signal SI is input to the selection control circuit 210 as a serial signal synchronized with the clock signal SCK. In addition, the print data signals SI are sequentially transferred in the p shift registers 212 that correspond to the p piezoelectric elements 60 in synchronization with the clock signal SCK. Then, when the input of the clock signal SCK is stopped, the print data [SIH, SIL] that corresponds to each of the p piezoelectric elements 60 is held in the shift registers 212. The print data signal SI is input in the order corresponding to the p-th stage, . . . , the second stage, and the first stage piezoelectric elements 60 of the shift register 212.

When the latch signal LAT rises, each of the latch circuits 214 latches the print data [SIH, SIL] held in the shift register 212 all at once. LT1, LT2, . . . , and LTp illustrated in FIG. 14 indicate the print data [SIH, SIL] latched by the latch circuits 214 that correspond to the 1-stage, 2-stage, . . . , and p-stage shift registers 212.

The decoder 216 outputs the logic levels of the selection signal S in each of the periods t1, t2, and t3 with the contents illustrated in FIG. 12, according to the size of the dot defined by the latched print data [SIH, SIL]. The selection circuit 230 selects or does not select the signal waveforms of the drive signal COM according to the logic levels of the selection signal S output by the decoder 216, thereby generating the drive signal VOUT.

Specifically, when the print data [SIH, SIL]=[1, 1] is input to the decoder 216, the decoder 216 sets the logic level of the selection signal S to H, H, and L levels within the periods t1, t2, and t3. Accordingly, the selection circuit 230 selects the trapezoidal waveform Adp within the period t1, selects the trapezoidal waveform Bdp within the period t2, and does not select the trapezoidal waveform Cdp within the period t3. As a result, the drive signal selection circuit 200 outputs the drive signal VOUT that corresponds to the “large dot LD”.

When the drive signal VOUT corresponding to the “large dot LD” is supplied to the piezoelectric element 60, a medium amount of ink is ejected within the period t1, a small amount of ink is ejected within the period t2, and the ink is not ejected within the period t3. Then, a medium amount of the ejected ink and a small amount of the ejected ink land on the medium P and are combined to form the “large dot LD” on the medium P.

Further, when the print data [SIH, SIL]=[1, 0] is input to the decoder 216, the decoder 216 sets the logic level of the selection signal S to H, L, and L levels within the periods t1, t2, and t3. In this case, the selection circuit 230 selects the trapezoidal waveform Adp within the period t1, does not select the trapezoidal waveform Bdp within the period t2, and does not select the trapezoidal waveform Cdp within the period t3. As a result, the drive signal selection circuit 200 outputs the drive signal VOUT that corresponds to the "medium dot MD".

When the drive signal VOUT corresponding to the "medium dot MD" is supplied to the piezoelectric element 60, a medium amount of ink is ejected within the period t1, the ink is not ejected within the period t2, and the ink is not ejected within the period t3. A medium amount of the ejected ink lands on the medium P, so that the "medium dot MD" is formed at the medium P.

Further, when the print data [SIH, SIL]=[0, 1] is input to the decoder 216, the decoder 216 sets the logic level of the selection signal S to L, H, and L levels within the periods t1, t2, and t3. In this case, the selection circuit 230 does not select the trapezoidal waveform Adp within the period t1, selects the trapezoidal waveform Bdp within the period t2, and does not select the trapezoidal waveform Cdp within the period t3. As a result, the drive signal selection circuit 200 outputs the drive signal VOUT that corresponds to the "small dot SD".

When the drive signal VOUT corresponding to the "small dot SD" is supplied to the piezoelectric element 60, the ink is not ejected within the period t1, the small amount of ink is ejected within the period t2, and the ink is not ejected within the period t3. A small amount of the ejected ink lands on the medium P, so that the "small dot SD" is formed at the medium P.

Further, when the print data [SIH, SIL]=[0, 0] is input to the decoder 216, the decoder 216 sets the logic level of the selection signal S to L, L, and H levels within the periods t1, t2, and t3. In this case, the selection circuit 230 does not select the trapezoidal waveform Adp within the period t1, does not select the trapezoidal waveform Bdp within the period t2, and selects the trapezoidal waveform Cdp within the period t3. As a result, the drive signal selection circuit 200 outputs the drive signal VOUT that corresponds to the "non-recording ND".

When the drive signal VOUT corresponding to the "non-recording ND" is supplied to the piezoelectric element 60, the ink is not ejected within the period t1, the ink is not ejected within the period t2, and the ink is not ejected within the period t3. Therefore, the "non-recording ND" in which dots are not formed at the medium P is obtained. In this case, the drive signal VOUT including the trapezoidal waveform Cdp is input to the corresponding piezoelectric element 60. Therefore, the micro-vibration is performed. As a result, there is a possibility that the viscosity of the ink increases near the opening portion of the corresponding nozzle 321 is reduced.

As described above, the drive signal selection circuit 200 selects or does not select the signal waveform of the drive signal COM output by the drive circuit 50 to generate the drive signal VOUT and output the drive signal VOUT to the corresponding piezoelectric element 60. Therefore, the drive signal VOUT includes any of the trapezoidal waveforms Adp, Bdp, and Cdp of the drive signal COM output by the drive circuit 50. In this case, the print head 22 that ejects the ink based on the drive signal VOUT can also be considered to eject the ink based on the drive signal COM.

Figure 13:
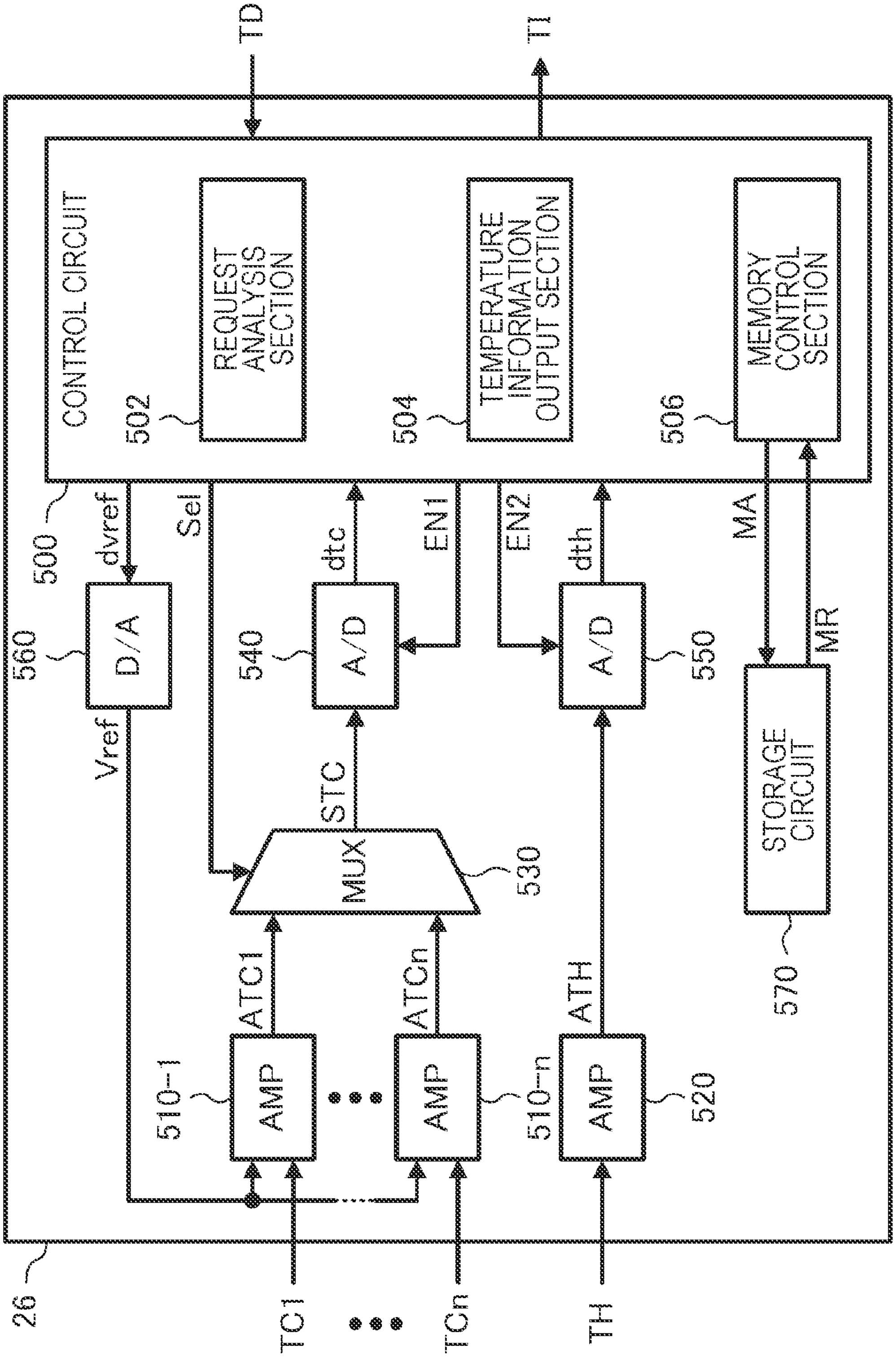
FIG. 13 is a diagram illustrating an example of a functional configuration of a temperature information output circuit.

Functional Configuration and Operation of Temperature Information Output Circuit Next, a functional configuration and an operation of the temperature information output circuit 26 will be described. FIG. 13 is a diagram illustrating an example of a functional configuration of the temperature information output circuit 26. The temperature information output circuit 26 acquires the head temperature signals TC1 to TCn including the head temperature information tc1 to tcn input from the print heads 22-1 to 22-*n*, respectively, and the unit temperature signal TH including the unit temperature information th input from the temperature detection circuit 28, and generates the temperature information signal TI indicating the temperature of the print head 22 according to the temperature acquisition request signal TD input from the control circuit 100. Then, the temperature information output circuit 26 outputs the generated temperature information signal TI to the control circuit 100.

As illustrated in FIG. 13, the temperature information output circuit 26 includes a control circuit 500, amplification circuits 510-1 to 510-*n*, and 520, a multiplexer 530, AD conversion circuits 540 and 550, a DA conversion circuit 560, and a storage circuit 570.

The amplification circuits 510-1 to 510-*n* are provided on the print head 22-1 to 22-*n*. Each of the head temperature signals TC1 to TCn output by the corresponding print heads 22-1 to 22-*n* and the reference potential signal Vref are input to each of the amplification circuits 510-1 to 510-*n*. The amplification circuits 510-1 to 510-*n* output head temperature amplification signals ATC1 to ATCn by amplifying the corresponding head temperature signals TC1 to TCn with the voltage value of the reference potential signal Vref as a reference potential.

Specifically, the head temperature signal TC1 output by the print head 22-1 and the reference potential signal Vref are input to the amplification circuit 510-1. The amplification circuit 510-1 outputs the head temperature amplification signal ATC1 obtained by amplifying a difference between the input voltage value of the head temperature signal TC1 and the voltage value of the reference potential signal Vref. In addition, a head temperature signal TCj output by a print head 22-*j* and the reference potential signal Vref are input to the amplification circuit 510-*j* (j is any of 1 to n). The amplification circuit 510-*j* outputs the head temperature amplification signal ATCj obtained by amplifying a difference between the input voltage value of the head temperature signal TCj and the voltage value of the reference potential signal Vref. In this case, the amplification circuits 510-1 to 510-*n* have similar configurations, and when there is no need to differentiate in the description below, the amplification circuits 510-1 to 510-*n* may be referred to as the amplification circuit 510. In this case, the description is made in which the head temperature signal TC as the head temperature signals TC1 to TCn and the reference potential signal Vref are input to the amplification circuit 510, and the head temperature amplification signal ATC as the head temperature amplification signals ATC1 to ATCn are output to the amplification circuit 510.

The head temperature amplification signals ATC1 to ATCn output by the amplification circuits 510-1 to 510-*n*, respectively, are input to the multiplexer 530. In addition, the select signal Sel output by the control circuit 500 is input to the multiplexer 530. The multiplexer 530 selects one of the head temperature amplification signals ATC1 to ATCn input from each of the amplification circuits 510-1 to 510-*n* according to the input select signal Sel, and outputs the selected head temperature amplification signal as the selection temperature signal STC.

The selection temperature signal STC output by the multiplexer 530 and the enable signal EN1 output by the control circuit 500 are input to the AD conversion circuit 540. The AD conversion circuit 540 converts the selection temperature signal STC, which is input within a period in which the input enable signal EN1 is validated, into a digital signal, and outputs the digital signal to the control circuit

500. That is, the AD conversion circuit 540 uses the voltage value of the head temperature information tc of the head temperature signal TC selected by the multiplexer 530 within the period in which the enable signal EN1 is validated among the head temperature signals TC1 to TCn input to the temperature information output circuit 26, to generate a digital signal of a voltage value according to the temperature of the print head 22 corresponding to the head temperature signal TC selected by the multiplexer 530 within the period in which the enable signal EN1 is validated, which is a digital signal according to the voltage value amplified by the amplification circuit 510 and to output the digital signal to the control circuit 500. In the following description, the digital signal output by the AD conversion circuit 540 is referred to as digital temperature information dtc.

The unit temperature signal TH is input to the amplification circuit 520. Then, the amplification circuit 520 outputs the unit amplification temperature signal ATH by amplifying the input unit temperature signal TH.

The unit amplification temperature signal ATH output by the amplification circuit 520 and the enable signal EN2 output by the control circuit 500 are input to the AD conversion circuit 550. The AD conversion circuit 550 converts the unit amplification temperature signal ATH, which is input within a period in which the input enable signal EN2 is validated, into a digital signal, and outputs the digital signal to the control circuit 500. The AD conversion circuit 540 uses the voltage value of the unit temperature information th of the unit temperature signal TH that is input within the period in which the enable signal EN2 is validated, to generate a digital signal according to the voltage value amplified by the amplification circuit 520, that is, a digital signal including the voltage value according to the temperature of the head unit 20 within the period in which the enable signal EN2 is validated, and outputs the digital signal to the control circuit 500. In the following description, the digital signal output by the AD conversion circuit 550 may be referred to as digital temperature information dth.

A digital reference potential signal dvref output by the control circuit 500 is input to the DA conversion circuit 560. The DA conversion circuit 560 generates the reference potential signal Vref by converting the digital reference potential signal dvref into an analog signal. Then, the DA conversion circuit 560 outputs the generated reference potential signal Vref to the amplification circuits 510-1 to 510-*n*. That is, the voltage value of the reference potential signal Vref input to the amplification circuits 510-1 to 510-*n* is controlled by the control circuit 500 and the DA conversion circuit 560.

The control circuit 500 includes a request analysis section 502, a temperature information output section 504, and a memory control section 506. The temperature acquisition request signal TD is input to the control circuit 500. The control circuit 500 generates the select signal Sel, the enable signals EN1 and EN2, and the digital reference potential signal dvref according to the input temperature acquisition request signal TD, and controls the various configurations of the temperature information output circuit 26. In addition, the digital temperature information dtc according to the select signal Sel and the enable signal EN1 is input to the control circuit 500. The control circuit 500 generates the temperature information signal TI based on the input digital temperature information dtc, and outputs the temperature information signal TI from the temperature information output circuit 26.

Specifically, the temperature acquisition request signal TD is input to the request analysis section 502. The request analysis section 502 analyzes the input temperature acquisition request signal TD. Then, the request analysis section 502 outputs the digital reference potential signal dvref, the select signal Sel, and the enable signals EN1 and EN2 according to the analysis result to the corresponding configurations.

The digital temperature information dtc is input to the temperature information output section 504. The temperature information output section 504 generates the temperature information signal TI according to the temperatures of the print heads 22-1 to 22-*n* based on the input digital temperature information dtc, and outputs the temperature information signal TI to the control circuit 100. The digital temperature information dth may be input to the temperature information output section 504 in addition to the digital temperature information dtc, and in this case, the temperature information output section 504 may output the temperature information signal TI corrected based on the input digital temperature information dtc and digital temperature information dth.

The memory control section 506 generates the memory control signal MA for accessing the storage circuit 570, outputs the memory control signal MA to the storage circuit 570, and acquires the memory read signal MR output by the storage circuit 570 in response to the memory control signal MA. For example, the memory control section 506 generates the memory control signal MA for reading, from the storage circuit 570, the voltage value of the reference potential signal Vref according to the analysis result of the request analysis section 502, and outputs the memory control signal MA to the storage circuit 570. As a result, the memory read signal MR including the information about the voltage value read from the storage circuit 570 is input to the memory control section 506. Then, the control circuit 500 generates the digital reference potential signal dvref corresponding to the voltage value read from the storage circuit 570, and outputs the digital reference potential signal dvref to the DA conversion circuit 560.

Some of the control circuit 500, amplification circuits 510-1 to 510-*n* and 520, multiplexer 530, AD conversion circuits 540 and 550, DA conversion circuit 560, and storage circuit 570 of the temperature information output circuit 26 may be configured as one or a plurality of integrated circuits.

Figure 14:
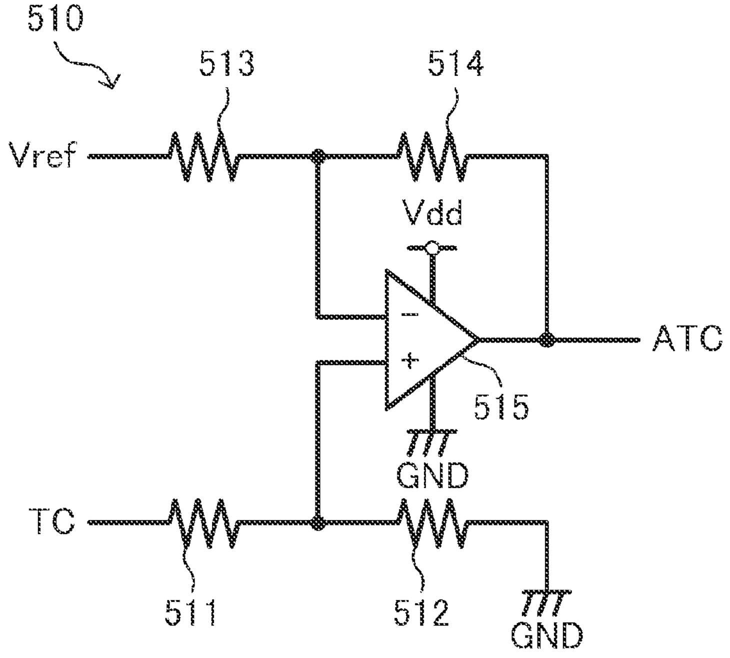
FIG. 14 is a diagram illustrating a specific example of a configuration of an amplification circuit.

Next, an example of a configuration of the amplification circuit 510 of the temperature information output circuit 26 will be described. FIG. 14 is a diagram illustrating a specific example of the configuration of the amplification circuit 510. As illustrated in FIG. 14, the amplification circuit 510 includes resistors 511 to 514 and an operational amplifier 515.

A voltage Vdd of any voltage value is input to a high voltage side input terminal of the operational amplifier 515, and a ground potential GND is supplied to a low voltage side input terminal. That is, the operational amplifier 515 operates based on a potential difference between the voltage Vdd and the ground potential GND.

A + side input terminal of the operational amplifier 515 is electrically coupled to one end of the resistor 511 and one end of the resistor 512, and a − side input terminal of the operational amplifier 515 is electrically coupled to one end of the resistor 513 and one end of the resistor 514. In addition, the head temperature signal TC is input to the other end of the resistor 511, the ground potential GND is supplied to the other end of the resistor 512, the reference potential signal Vref is supplied to the other end of the resistor 513, and the other end of the resistor 514 is electrically coupled to the output terminal of the operational amplifier 515.

The amplification circuit 510 configured as described above constitutes a so-called differential amplification circuit that amplifies a signal according to a difference between the voltage value of the head temperature signal TC and the voltage value of the reference potential signal Vref at an amplification rate defined by the resistors 511 to 514 to generate and output the head temperature amplification signal ATC.

Figure 15:
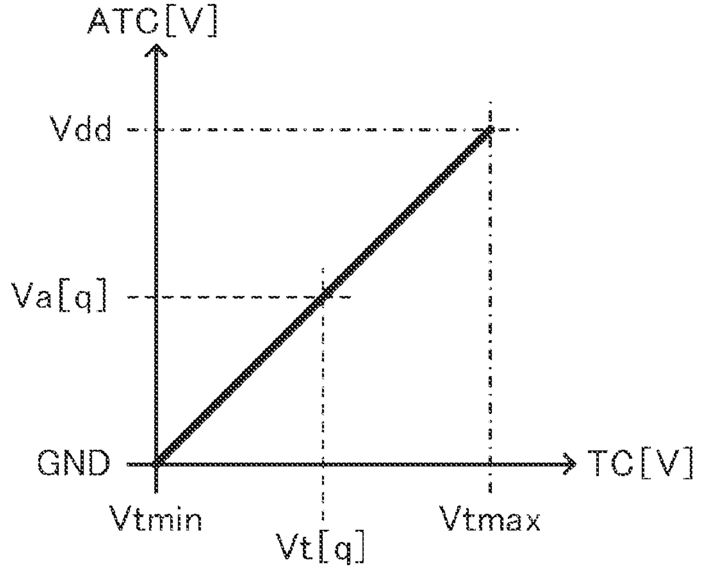
FIG. 15 is a diagram illustrating an example of a relationship between a voltage value of a head temperature signal and a voltage value of a head temperature amplification signal when an ideal head temperature signal is input to the amplification circuit.

FIG. 15 is a diagram illustrating an example of a relationship between the voltage value of the head temperature signal TC and the voltage value of the head temperature amplification signal ATC when an ideal head temperature signal TC is input to the amplification circuit 510.

FIG. 15 illustrates the voltage value of the head temperature signal TC input to the amplification circuit 510 as a voltage Vtmin when the temperature of the print head 22 or the liquid ejecting apparatus 1 is any temperature of the minimum temperature or lower defined based on product specifications and the like, and illustrates the voltage value of the head temperature signal TC input to the amplification circuit 510 as a voltage Vtmax when the temperature of the print head 22 or the liquid ejecting apparatus 1 is any temperature of the maximum temperature or higher defined by product specifications and the like. That is, the voltage Vtmin corresponds to the voltage value of the head temperature information tc output by the temperature detection circuit 24 when the temperature of the print head 22 or the liquid ejecting apparatus 1 is any temperature of the minimum temperature or lower defined based on product specifications and the like, and the voltage Vtmax corresponds to the voltage value of the head temperature information tc output by the temperature detection circuit 24 when the temperature of the print head 22 or the liquid ejecting apparatus 1 is any temperature of the maximum temperature or higher defined by product specifications and the like.

FIG. 15 illustrates a voltage value of any timing of the head temperature signal TC as a voltage Vt[q], and illustrates the voltage value of the head temperature amplification signal ATC output by the amplification circuit 510 as a voltage Va[q] when the voltage Vt[q] is input to the amplification circuit 510. That is, the voltage Vt[q] corresponds to the voltage value of the head temperature information tc acquired by the temperature detection circuit 24 at any timing, and the voltage Va[q] corresponds to a voltage value obtained by amplifying the head temperature information tc acquired by the temperature detection circuit 24 at any timing. In the following description, when the timing is not particularly defined, the voltage value of the head temperature signal TC may be referred to as a voltage Vt, and when the voltage Vt is input to the amplification circuit 510, the voltage value of the head temperature amplification signal ATC output by the amplification circuit 510 may be referred to as a voltage Va.

As illustrated in FIG. 15, the amplification circuit 510 outputs the head temperature amplification signal ATC having linearity in voltage value of the input head temperature signal TC. In this case, the voltage Vt[q] input to the amplification circuit 510 and the voltage Va[q] output by the amplification circuit 510 have a relationship such as the following Equation (1) when the voltage value of the reference potential signal Vref is the voltage vref and the resistance values of the resistors 511 to 514 are the resistance value r511 to r514, respectively.

$$Va[q] = \left(\frac{r513 + r514}{r513}\right)\left(\frac{r512}{r511 + r512}\right)Va[q] - \frac{r514}{r513}vref \tag{1}$$

In this case, a ratio between the resistance value of the resistor 511 and the resistance value of the resistor 512 is the same as a ratio between the resistance value of the resistor 513 and the resistance value of the resistor 514, and preferably, the resistance values of the resistors 511 to 514 are set such that the resistance value of the resistor 511 is equal to the resistance value of the resistor 513 and the resistance value of the resistor 512 is equal to the resistance value of the resistor 514. Accordingly, Equation (1) can be expressed as the following Equation (2).

$$Va[q] = \left(\frac{r514}{r513}\right)(Va[q] - vref) \tag{2}$$

Here, equal resistance values are not limited to the fact that the actually measured resistance values are the same, and a range where they can be deemed to be equivalent in a situation where variance in resistance values is taken into consideration is included. When the resistance value of the resistor 511 is equal to the resistance value of the resistor 513, it means that the resistance value of the resistor 511 is equal to a rated value of the resistance value of the resistor 513, and when the resistance value of the resistor 512 is equal to the resistance value of the resistor 514, it means that the resistance value of the resistor 512 is the same as a rated value of the resistance value of the resistor 514.

As described above, the amplification circuit 510 of the present embodiment outputs the voltage Va[q] obtained by multiplying the amplification rate defined by the ratio between the resistance values of the resistors 513 and 514 by a voltage difference between the voltage Vt[q] and the voltage vref. In other words, the amplification circuit 510 of the present embodiment constitutes a differential amplification circuit that amplifies a difference between the reference potential signal Vref and the head temperature signal TC.

As illustrated in FIG. 15, the amplification circuit 510 of the present embodiment sets a value of the resistance values of the resistors 511 to 514 for defining the amplification rate such that the voltage value of the head temperature amplification signal ATC is substantially 0 V when the voltage value of the head temperature signal TC is the voltage Vtmin and the voltage value of the head temperature amplification signal ATC is substantially voltage Vdd when the voltage value of the head temperature signal TC is the voltage Vtmax. That is, the value of the resistance values of the resistors 511 to 514, which is the amplification rate of the amplification circuit 510, is set such that a dynamic range of the amplification circuit 510 is a range from the ground potential GND, which is input to the low potential side input terminal of the operational amplifier 515, to the voltage Vdd, which is input to the high potential side input terminal of the operational amplifier 515. Accordingly, the detection accuracy of the head temperature signal TC in the amplification circuit 510 is improved, and the output accuracy of the head temperature amplification signal ATC output by the amplification circuit 510 is improved. As a result, it is possible to improve the detection accuracy of the temperature of the print head 22 based on the head temperature amplification signal ATC output by the amplification circuit 510.

In this case, any temperature when the voltage value of the head temperature signal TC is the voltage Vtmin may be, for example, the minimum value of a design temperature at which the print head 22 or the liquid ejecting apparatus 1 can operate without failure, and any temperature when the voltage value of the head temperature signal TC is the voltage Vtmax may be, for example, the maximum value of a design temperature at which the print head 22 or the liquid ejecting apparatus 1 can operate without failure. Any temperature when the voltage value of the head temperature signal TC is the voltage Vtmin and any temperature when the voltage value of the head temperature signal TC is the voltage Vtmax are not limited to the temperatures described above, and may be any temperature according to the use application and use environment of the liquid ejecting apparatus 1.

Further, when the dynamic range of the amplification circuit 510 is set from the ground potential GND, which is input to the low potential side input terminal of the operational amplifier 515 to the voltage Vdd, which is input to the high potential side input terminal of the operational amplifier 515, it means that the dynamic range of the amplification circuit 510 is set from the from the ground potential GND, which is input to the low potential side input terminal of the operational amplifier 515 to the voltage Vdd, which is input to the high potential side input terminal of the operational amplifier 515 when variance in resistance values of the resistors 511 to 514, offset voltage of the operational amplifier 515 or the like are taken into consideration. That is, the resistance values of the resistors 511 to 514 are not limited to when the resistance values are set from the ground potential GND, which is input to the low potential side input terminal of the operational amplifier 515 to the voltage Vdd, which is input to the high potential side input terminal of the operational amplifier 515, are set such that a low potential side voltage value of the dynamic range of the amplification circuit 510 is as close to the ground potential GND as possible, and may be set such that the high potential side voltage value of the dynamic range of the amplification circuit 510 is as close to the voltage Vdd as possible.

However, when the temperature detection circuit 24 including the resistance wiring 401 s provided inside the print head 22 as described in the present embodiment, the resistance wiring 401 of the temperature detection circuit 24 is formed as a narrow and long wiring pattern, and thus there is a risk of large variations in the resistance value of the resistance wiring 401 due to manufacturing variations and the like. That is, there is a possibility that a large variation occurs in the voltage value of the head temperature information tc output by the print head 22.

The variation in the voltage value of the head temperature signal TC including the head temperature information tc is directly related to the variation in the voltage value of the head temperature amplification signal ATC output by the amplification circuit 510. In particular, when the wide dynamic range of the amplification circuit 510 is secured as illustrated in FIG. 15, the voltage value of the head temperature amplification signal ATC to be outputted is limited by the voltage Vdd or the ground potential GND due to variation in the voltage value of the head temperature signal TC including the head temperature information tc. As a result, there is a risk that the reliability of the head temperature amplification signal ATC output by the amplification circuit 510 is deteriorated.

To solve the problem, for example, by adjusting the resistance values of the resistors 511 to 514 of the amplification circuit 510 to narrow the dynamic range of the amplification circuit 510, it is also possible to reduce the risk of limiting the voltage value of the head temperature amplification signal ATC due to the variation in the voltage value of the head temperature signal TC including the head temperature information tc. However, in this case, since the dynamic range of the amplification circuit 510 is narrowed, the acquisition accuracy of the head temperature signal TC in the amplification circuit 510 is deteriorated, and the reliability of the head temperature amplification signal ATC output by the amplification circuit 510 is deteriorated.

That is, when a configuration in which the temperature of the print head 22 is detected using the temperature detection circuit 24 including the resistance wiring 401 provided inside the print head 22 is adopted, a new problem has arisen in that the reliability of the head temperature amplification signal ATC output by the amplification circuit 510 may be deteriorated.

To solve the problem, the liquid ejecting apparatus 1 and the head unit 20 of the present embodiment corrects the variation in the voltage value of the head temperature information tc, which occurs due to the variation in the resistance value of the resistance wiring 401 of the temperature detection circuit 24, by adjusting the voltage value of the reference potential signal Vref. Accordingly, it is possible to reduce the risk that the voltage value of the head temperature amplification signal ATC is limited in a state in which the dynamic range of the amplification circuit 510 is widely secured. As a result, even when a configuration in which the temperature of the print head 22 is detected using the temperature detection circuit 24 including the resistance wiring 401 provided inside the print head 22 is adopted, the reliability of the head temperature amplification signal ATC output by the amplification circuit 510 is deteriorated, and as a result, the accuracy of temperature information of the print head 22 of the temperature information signal TI output by the temperature information output circuit 26 is improved. That is, the acquisition accuracy of the temperature of the print head 22 is improved in the configuration in which the temperature detection circuit 24 is provided inside the print head 22.

That is, in the liquid ejecting apparatus 1 and the head unit 20 of the present embodiment, the temperature information output circuit 26 includes: the amplification circuit 510 that amplifies the difference between the reference potential signal Vref and the head temperature signal TC; the temperature information output section 504 that outputs the output of the amplification circuit 510 as the temperature information signal TI, and the control circuit 500 and the DA conversion circuit 560 that output the reference potential signal Vref of the voltage value according to the head temperature signal TC to the amplification circuit 510. Thus, the reliability of the head temperature amplification signal ATC output by the amplification circuit 510 is improved, so that the accuracy of the temperature of the print head 22 of the temperature information signal TI output by the temperature information output circuit 26 can be improved.

Figure 16:
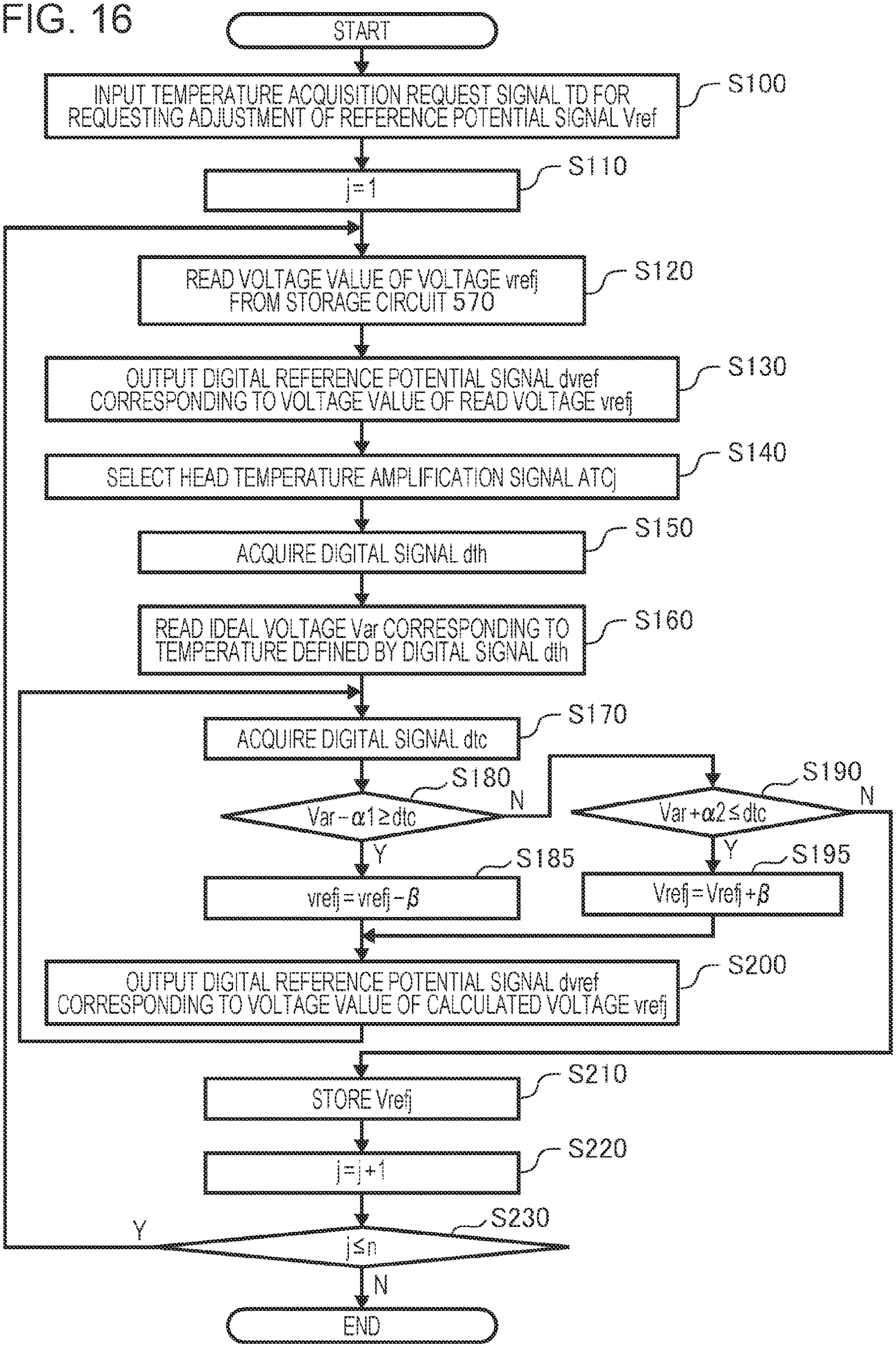
FIG. 16 is a diagram illustrating an example of a method for adjusting a voltage value of a reference potential signal.

A specific example of a method for adjusting the voltage value of the reference potential signal Vref input to the amplification circuit 510 will be described. FIG. 16 is a diagram illustrating an example of a method for adjusting the voltage value of the reference potential signal Vref.

Frist, when adjusting the voltage value of the reference potential signal Vref, the temperature information output circuit 26 calculates the voltage value of the head temperature amplification signal ATC output by the amplification circuit 510, when the head temperature signal TC having an ideal voltage value is input to the amplification circuit 510 based on the resistance values r511 to r514 of the resistors 511 to 514 of the amplification circuit 510 and Equation (2). Then, the temperature information output circuit 26 stores the calculated ideal voltage Var in the storage circuit 570 in association with the voltage value of the head temperature signal TC. The ideal voltage Var can be calculated from the resistance values r511 to r514 of the known resistors 511 to 514 and design information of the temperature detection circuit 24 including the known resistance wiring 401. Therefore, the ideal voltage Var associated with the voltage value of the head temperature signal TC may be stored in the storage circuit 570, for example, at the manufacturing stage of the liquid ejecting apparatus 1.

The temperature information output circuit 26 starts adjustment of the voltage vref corresponding to each of the amplification circuits 510-1 to **510-*n* by inputting the temperature acquisition request signal TD for requesting the adjustment of the voltage vref, which is the voltage value of the reference potential signal Vref input from the control circuit 100 to the amplification circuits 510-1 to 510-*n* corresponding to the respective print heads 22-1 to 22-*n* (step S100). In the present embodiment, the temperature information output circuit 26 calculates the voltage value of the reference potential signal Vref corresponding to each of the amplification circuits 510-1 to 510-*n*. Therefore, in the following description, the voltage value of the reference potential signal Vref corresponding to the amplification circuit 510-1 is referred to as a voltage vref1, and the voltage value of the reference potential signal Vref corresponding to the amplification circuit 510-*n*** is referred to as a voltage vrefn.

The temperature information output circuit 26 initializes variable j into 1 (j=1) by inputting the temperature acquisition request signal TD for requesting the adjustment of the voltage value of the reference potential signal Vref (step S110). Thereafter, since the variable j is "1", the control circuit 500 reads, from the storage circuit 570, information of the voltage value of the voltage vref1 from the storage circuit 570 (step S120). Then, the control circuit 500 generates the digital reference potential signal dvref corresponding to the read voltage value of the voltage vref1 and outputs the digital reference potential signal dvref to the DA conversion circuit 560. That is, the control circuit 500 outputs the digital reference potential signal dvref corresponding to the read voltage value of the voltage vref1 (step S130). As a result, the DA conversion circuit 560 outputs the reference potential signal Vref corresponding to the amplification circuit 510-1, that is, the reference potential signal Vref having the voltage value of the voltage vref1 to the amplification circuit 510-1.

Further, the temperature information output circuit 26 generates the select signal Sel for selecting the head temperature amplification signal ATC1 amplified by the amplification circuit 510-1, and outputs the select signal Sel to the multiplexer 530. As a result, the multiplexer 530 selects the head temperature amplification signal ATC1 as the head temperature amplification signal ATCj (step S140), and outputs the head temperature amplification signal ATC1 as the selection temperature signal STC.

Thereafter, the control circuit 500 of the temperature information output circuit 26 outputs the enable signal EN2 for validating the analog/digital conversion in the AD conversion circuit 550. Accordingly, the AD conversion circuit 550 outputs the digital temperature information dth obtained by converting the unit amplification temperature signal ATH, which is obtained by amplifying, using the amplification circuit 520, the voltage value of the unit temperature information th of the unit temperature signal TH output by the temperature detection circuit 28, into a digital signal, and the control circuit 500 acquires the digital temperature information dth output by the AD conversion circuit 550 (step S150).

The control circuit 500 calculates the voltage value of the head temperature signal TC in an ideal state corresponding to the temperature defined by the acquired digital temperature information dth. The temperature defined by the digital temperature information dth is a temperature of the head unit 20 including the print heads 22-1 to **22-*n*, and matches an ambient temperature of the print heads 22-1 to 22-*n*, that is, an environmental temperature of the print heads 22-1 to 22-*n* within a period in which the print heads 22-1 to 22-*n* are not driven. In other words, the control circuit 500 estimates the temperature of the print head 22-1** based on the temperature defined by the digital temperature information dth, and calculates the voltage value of the head temperature signal TC in the ideal state from the estimated temperature.

The control circuit 500 causes the storage circuit 570 to read the ideal voltage Var corresponding to the calculated voltage value of the head temperature signal TC in the ideal state. That is, the control circuit 500 reads the ideal voltage Var corresponding to the temperature defined by the digital temperature information dth from the storage circuit 570 (step S160).

Thereafter, the control circuit 500 of the temperature information output circuit 26 outputs the enable signal EN1 for validating the analog/digital conversion in the AD conversion circuit 540. Accordingly, the AD conversion circuit 540 outputs, to the control circuit 500, the digital temperature information dtc obtained by converting the selection temperature signal STC corresponding to the head temperature amplification signal ATC1, which is the selection temperature signal STC output by the multiplexer 530, into a digital signal. That is, the control circuit 500 acquires the digital temperature information dtc output by the AD conversion circuit 540 (step S170).

The control circuit 500 compares the voltage value according to the acquired digital temperature information dtc with the voltage value of the ideal voltage Var read from the storage circuit 570. Then, the control circuit 500 determines whether or not the voltage value corresponding to the digital temperature information dtc is within a predetermined range based on the voltage value of the ideal voltage Var.

Specifically, the control circuit 500 compares the voltage value defined by the acquired digital temperature information dtc with a value obtained by subtracting a predetermined value $\alpha$1 from the voltage value of the ideal voltage Var read from the storage circuit 570 (step S180). Then, when the voltage value defined by the acquired digital temperature information dtc is equal to or less than the value obtained by subtracting the predetermined value $\alpha$1 from the voltage value of the ideal voltage Var read from the storage circuit 570 (Y in step S180), the control circuit 500 calculates a value obtained by subtracting a predetermined value $\beta$ from the voltage vref1, which is the voltage value of the reference potential signal Vref corresponding to the amplification circuit 510-1, as a new voltage vref1 (step S185).

On the other hand, when the voltage value defined by the acquired digital temperature information dtc is greater than the value obtained by subtracting the predetermined value $\alpha$1 from the voltage value of the ideal voltage Var read from the storage circuit 570 (N in step S180), the control circuit 500 compares the voltage value defined by the acquired digital temperature information dtc with a value obtained by adding a predetermined value $\alpha$2 to the voltage value of the ideal voltage Var read from the storage circuit 570 (step S190). Then, when the voltage value defined by the acquired digital temperature information dtc is equal to or greater than the value obtained by adding the predetermined value α2 to the voltage value of the ideal voltage Var read from the storage circuit 570 (Y in step S190), the control circuit 500 calculates a value obtained by adding the predetermined value β to the voltage vref1, which is the voltage value of the reference potential signal Vref corresponding to the amplification circuit 510-1, as a new voltage vref1 (step S195).

After the new voltage vref1 is calculated in step S185 or step S195, the control circuit 500 generates and outputs the digital reference potential signal dvref corresponding to the calculated voltage vref1 (step S200). As a result, the DA conversion circuit 560 outputs the reference potential signal Vref corresponding to the amplification circuit 510-1, that is, the reference potential signal Vref having the voltage value of newly calculated voltage vref1 to the amplification circuit 510.

Thereafter, the control circuit 500 re-acquires the digital temperature information dtc output by the AD conversion circuit 540 (step S160). That is, the control circuit 500 acquires the digital temperature information dtc obtained by converting the selection temperature signal STC corresponding to the head temperature amplification signal ATC1, which is obtained by amplifying a difference between the voltage value of the head temperature signal TC and the reference potential signal Vref of the newly calculated voltage vref1 by the amplification circuit 510-1, into a digital signal. Them, the control circuit 500 compares the voltage value defined by the acquired digital temperature information dtc with the voltage value of the ideal voltage Var read from the storage circuit 570, and adjusts the voltage value of the voltage vref1 according to the comparison result. The control circuit 500 repeatedly performs the adjustment of the voltage value of the voltage vref1 until the voltage value defined by the input digital temperature information dtc is within a predetermined range based on the voltage value of the ideal voltage Var. Specifically, the control circuit 500 repeatedly performs the adjustment of the voltage value of the voltage vref1 until the voltage value defined by the acquired digital temperature information dtc is greater than the value obtained by subtracting the predetermined value α1 from the voltage value of the ideal voltage Var read from the storage circuit 570 (N in step S180) and until the voltage value defined by the acquired digital temperature information dtc is less than the value obtained by adding the predetermined value α2 to the voltage value of the ideal voltage Var read from the storage circuit 570 (N in step S190).

The control circuit 500 stores, in the storage circuit 570 as the new voltage vref1 corresponding to the amplification circuit 510-1, the voltage vref1 (step S210) until the voltage value defined by the acquired digital temperature information dtc is greater than the value obtained by subtracting the predetermined value α1 from the voltage value of the ideal voltage Var read from the storage circuit 570 (N in step S180) and until the voltage value defined by the acquired digital temperature information dtc is less than the value obtained by adding the predetermined value α2 to the voltage value of the ideal voltage Var read from the storage circuit 570 (N in step S190). The order in which the process performed in steps S180 and S185 illustrated in FIG. 16 and the process performed in steps S190 and S195 are performed may be reversed.

Thereafter, the temperature information output circuit 26 adds "1" to the variable j (step S220), and determines whether or not the variable j after the addition is equal to or less than "n", which is the total number of print heads 22 of the head unit 20 (step S230). When the variable j is equal to or less than "n", which is the total number of print heads 22 of the head unit 20 (Y in step S230), the temperature information output circuit 26 repeatedly performs the process up to step S120 to step S230. Therefore, the temperature information output circuit 26 calculates voltages vref1 to vrefn, which are voltage values of the reference potential signal Vref corresponding to the respective amplification circuits 510-1 to 510-*n* provided on the respective print heads 22-1 to 22-*n*, and stores the voltages vref1 to vrefn to the storage circuit 570. Thereafter, when the variable j exceeds "n", which is the total number of print heads 22 of the head unit 20 (N in step S230), the temperature information output circuit 26 ends the adjustment of the voltage value of the reference potential signal Vref.

The predetermined values α1 and α2 described above are, for example, values obtained by multiplying the potential difference between the voltage Vdd and the ground potential GND by a predetermined ratio, and are set to, for example, 1% of the potential difference. In addition, the predetermined value β is any voltage value that defines an adjustment width of the voltage vref to be adjusted.

Figure 17:
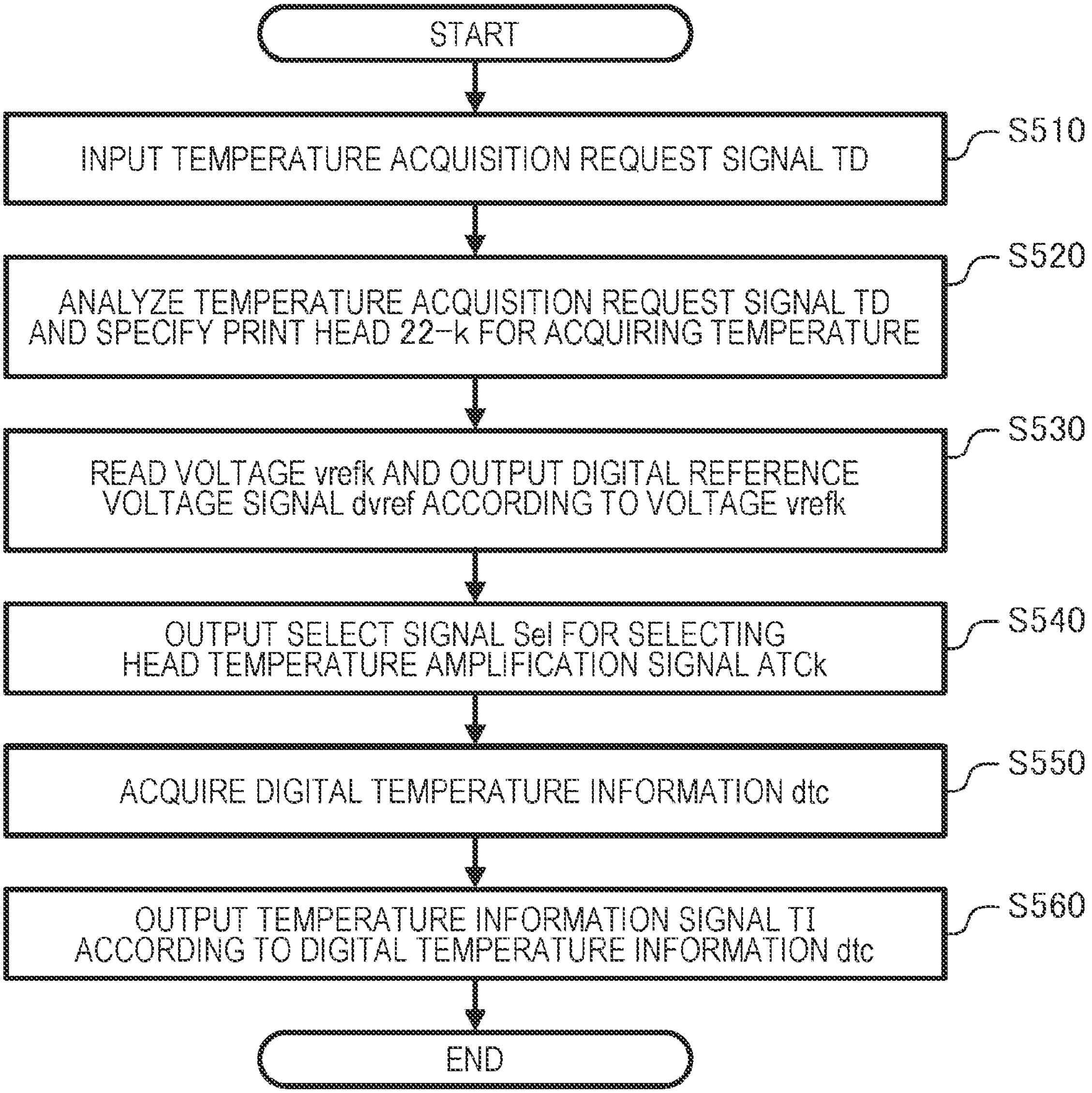
FIG. 17 is a diagram for explaining an example of a temperature operation of the print head.

Next, the acquisition of the temperature of the print head 22 using the voltages vref1 to vrefn stored in the storage circuit 570 in the temperature information output circuit 26 will be described. FIG. 17 is a diagram for explaining an example of a temperature operation of the print head 22. As illustrated in FIG. 17, the temperature acquisition request signal TD for requesting the acquisition of the temperature of any of the plurality of print heads 22 is input from the control circuit 100 to the temperature information output circuit 26 (step S510), thereby starting temperature information output processing by the temperature information output circuit 26.

When the temperature acquisition request signal TD for requesting the acquisition of the temperature of any of the plurality of print heads 22 in the temperature information output circuit 26 is input, the request analysis section 502 of the control circuit 500 of the temperature information output circuit 26 analyzes the temperature acquisition request signal TD and specifies a print head 22-*k* (k is any of 1 to n) that acquires the temperature in the plurality of print heads 22 (step S520). Thereafter, the temperature information output circuit 26 causes the storage circuit 570 to read the voltage vrefk corresponding to the print head 22-*k*, and outputs the digital reference potential signal dvref corresponding to the read voltage vrefk (step S530). As a result, the reference potential signal Vref of a voltage vrefk whose voltage value is adjusted is input to the amplification circuit 510-*k*.

Moreover, the temperature information output circuit 26 generates the select signal Sel for selecting the head temperature amplification signal ATCk, which is obtained by amplifying a potential difference between the head temperature signal TC output by the print head 22-*k* and the reference potential signal Vref by the amplification circuit 510-*k*, and outputs the select signal Sel to the multiplexer 530 (step S540). As a result, the multiplexer 530 selects the head temperature amplification signal ATCk, which is obtained by amplifying the difference between the head temperature signal TC output by the print head 22-*k* and the reference potential signal Vref of the voltage vrefk whose voltage value is adjusted by the amplification circuit 510-*k*, and outputs the head temperature amplification signal ATCk as the selection temperature signal STC.

Thereafter, the control circuit 500 of the temperature information output circuit 26 outputs the enable signal EN1 for validating the analog/digital conversion in the AD conversion circuit 540. As a result, the AD conversion circuit 540 converts, into the digital temperature information dtc, the selection temperature signal STC, that is, the head temperature amplification signal ATCk, which is obtained by amplifying the difference between the head temperature signal TC output by the print head 22-*k* and the reference potential signal Vref of the voltage vrefk whose voltage value is adjusted by the amplification circuit 510-*k*, and outputs the digital temperature information dtc to the control circuit 100. That is, the control circuit 500 acquires the digital temperature information dtc output by the AD conversion circuit 540 (step S550).

The temperature information output section 504 of the control circuit 500 outputs the temperature information signal TI according to the input digital temperature information dtc, that is, the temperature information signal TI obtained by converting the input digital temperature information dtc into a predetermined format (step S560). That is, the temperature information output section 504 outputs the digital temperature information dtc according to the head temperature information tck indicating the temperature of the print head 22-*k* as the temperature information signal TI. As a result, the temperature information output circuit 26 ends the output of the temperature information signal TI.

That is, the temperature information output circuit 26 of the liquid ejecting apparatus 1 and the head unit 20 of the present embodiment includes: the amplification circuit 510 that amplifies the difference between the reference potential signal Vref and the head temperature signal TC; the temperature information output section 504 that outputs the temperature information signal TI according to the output of the amplification circuit 510; the DA conversion circuit 560 and the control circuit 500 that control the voltage value of the reference potential signal Vref; and the storage circuit 570 that stores the voltages vref1 to vrefn according to the head temperature signal TC and the ambient temperature of the print head 22, and the DA conversion circuit 560 and the control circuit 500 output the reference potential signal Vref of the voltage value according to the voltages vref1 to vrefn.

Figures 18A, 18B, 18C:
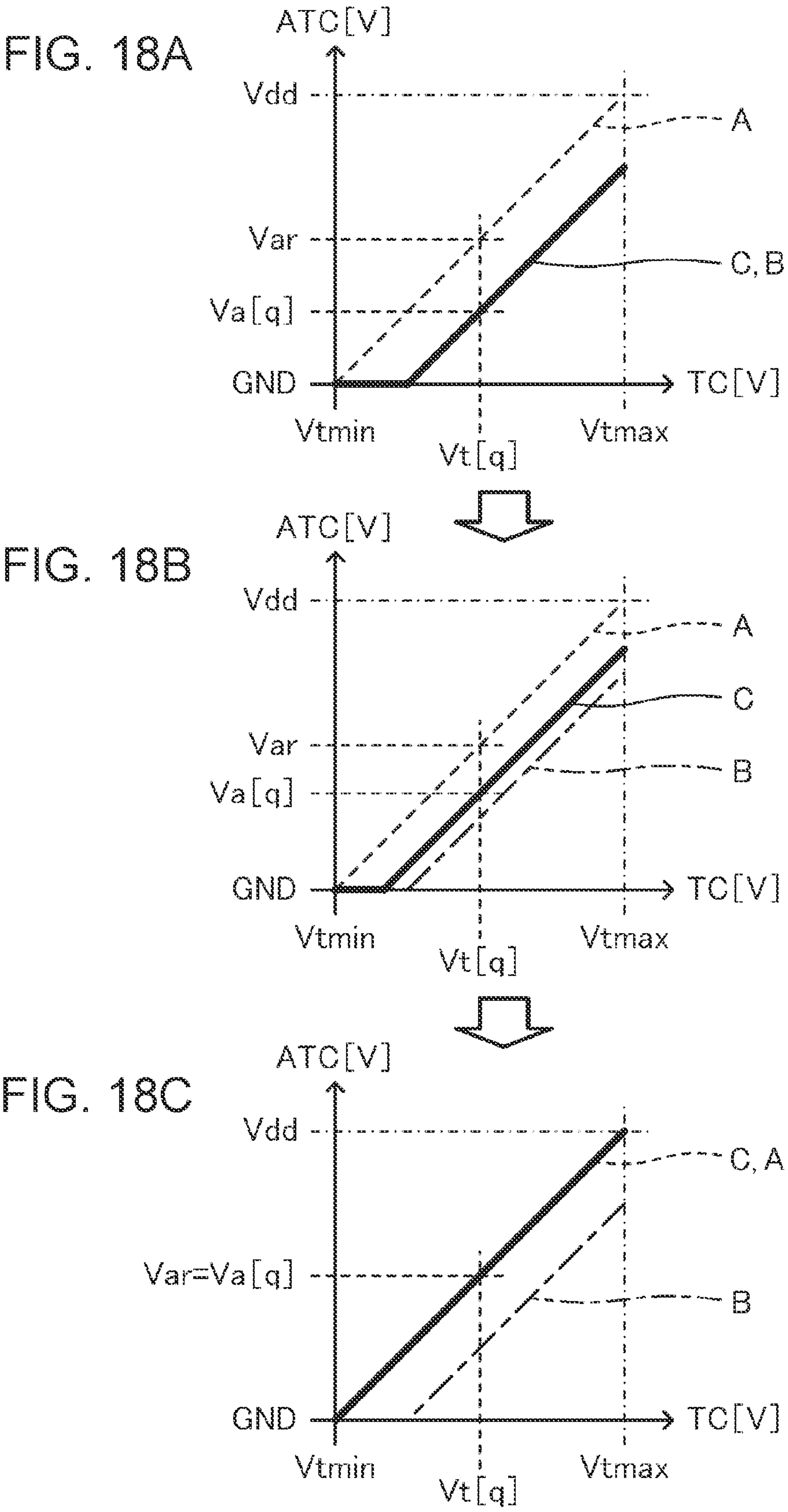
FIGS. 18A to 18C are diagrams illustrating an example of the head temperature amplification signal output by the amplification circuit before and after adjustment of the reference potential signal.

The method for adjusting a voltage value of the reference potential signal Vref will be schematically described with reference to FIGS. 18A to 19C. FIGS. 18A to 18C are diagrams illustrating an example of the head temperature amplification signal ATC output by the amplification circuit 510 before and after adjustment of the reference potential signal Vref. FIGS. 18A to 18C illustrate a relationship between the voltage value of the head temperature signal TC and the voltage value of the head temperature amplification signal ATC as straight line A when the ideal head temperature signal TC is input, illustrate a relationship between the voltage value of the input head temperature signal TC and the voltage value of the head temperature amplification signal ATC as straight line B before the adjustment of the voltage vref, which is the voltage value of the reference potential signal Vref, and illustrate a relationship between the voltage value of the input head temperature signal TC and the voltage value of the head temperature amplification signal ATC as straight line C during the adjustment of the voltage vref, which is the voltage value of the reference potential signal Vref.

As illustrated in FIG. 18A, before the adjustment of the voltage vref, which is the voltage value of the reference potential signal Vref, when the voltage value of the head temperature signal TC is the voltage Va[q], in a case where the voltage Va[q], which is the voltage value of the head temperature amplification signal ATC output by the amplification circuit 510, is less than the ideal voltage Var, as described above, the control circuit 500 outputs a value, which is obtained by subtracting the predetermined value β from the voltage vref1, which is the voltage value of the reference potential signal Vref, as a new voltage vref corresponding to the head temperature signal TC and the amplification circuit 510. As a result, when the voltage value of the head temperature signal TC is the voltage Vt[q], the voltage Va[q], which is the voltage value of the head temperature amplification signal ATC output by the amplification circuit 510, increases as illustrated in FIG. 18B. In other words, when the voltage value of the head temperature signal TC is the voltage Vt[q], the voltage Va[q], which is the voltage value of the head temperature amplification signal ATC output by the amplification circuit 510, is close to the ideal voltage Var.

The control circuit 500 repeatedly performs the adjustment of the voltage vref based on the comparison result between the voltage Va[q], which is the voltage value of the head temperature amplification signal ATC, and the ideal voltage Var. When the voltage value of the head temperature signal TC is the voltage Vt[q], the voltage Vt[q], which is the voltage value of the head temperature amplification signal ATC output by the amplification circuit 510, is within a predetermined range of the ideal voltage Var. Thus, as illustrated in FIG. 18C, the voltage value of the head temperature amplification signal ATC output by the amplification circuit 510 is substantially equal to the voltage value of the head temperature amplification signal ATC output by the amplification circuit 510 when the ideal head temperature signal TC is input to the amplification circuit 510.

Figures 19A, 19B, 19C:
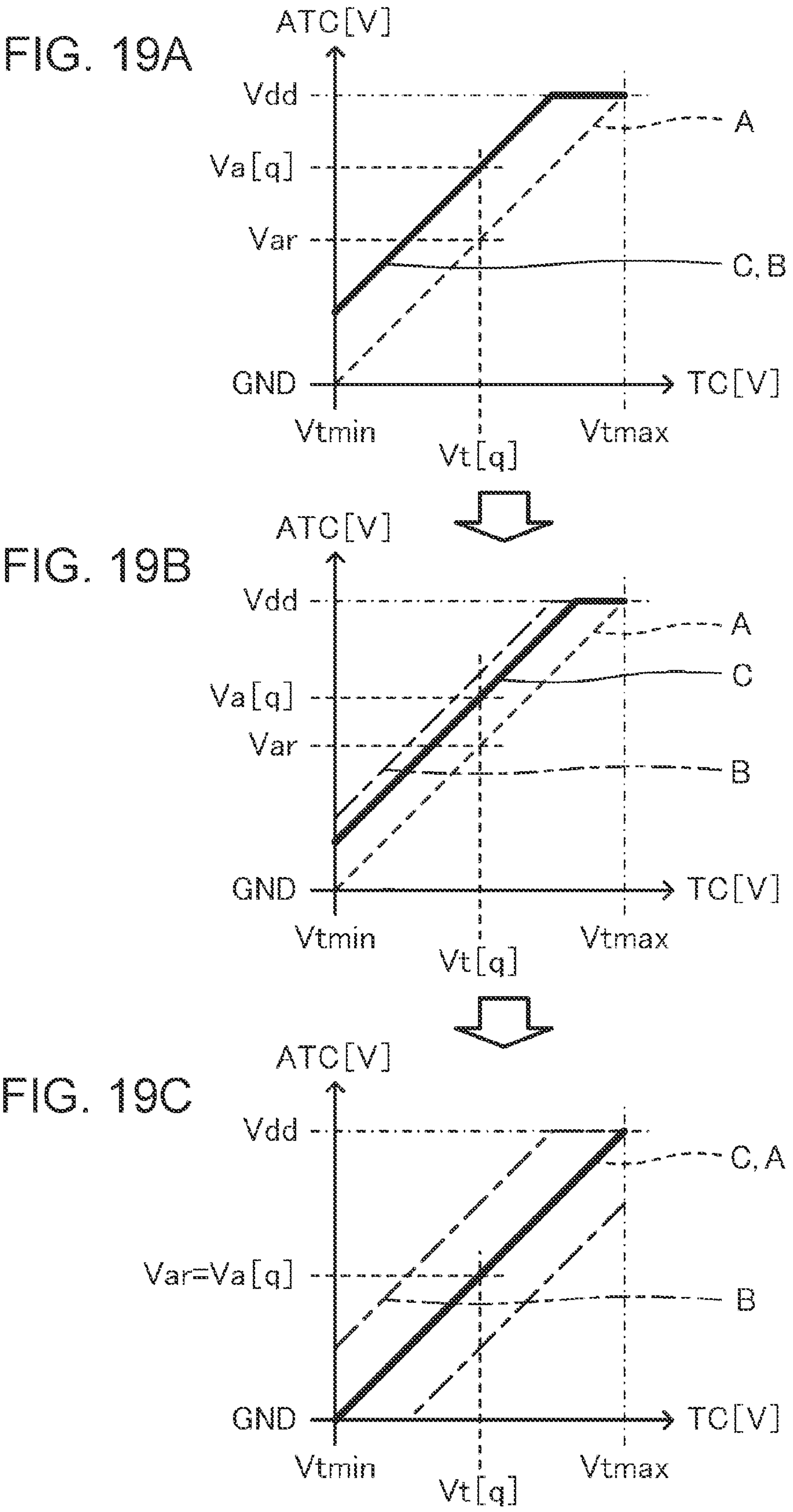
FIGS. 19A to 19C are diagram illustrating another example of the head temperature amplification signal output by the amplification circuit before and after adjustment of the reference potential signal.

FIGS. 19A to 19C are diagrams illustrating another example of the head temperature amplification signal ATC output by the amplification circuit 510 before and after adjustment of the reference potential signal Vref. Similar to FIGS. 18A to 18C, FIGS. 19A to 19C illustrate a relationship between the voltage value of the head temperature signal TC and the voltage value of the head temperature amplification signal ATC as straight line A when the ideal head temperature signal TC is input, illustrate a relationship between the voltage value of the input head temperature signal TC and the voltage value of the head temperature amplification signal ATC as straight line B before the adjustment of the voltage vref, which is the voltage value of the reference potential signal Vref, and illustrate a relationship between the voltage value of the input head temperature signal TC and the voltage value of the head temperature amplification signal ATC as straight line C during the adjustment of the voltage vref, which is the voltage value of the reference potential signal Vref.

As illustrated in FIG. 19A, before the adjustment of the voltage vref, which is the voltage value of the reference potential signal Vref, when the voltage value of the head temperature signal TC is the voltage Vt[q], in a case where the voltage Va[q], which is the voltage value of the head temperature amplification signal ATC output by the amplification circuit 510, is greater than the ideal voltage Var, as described above, the control circuit 500 outputs a value, which is obtained by adding the predetermined value β to the voltage vref1, which is the voltage value of the reference potential signal Vref, as a new voltage vref corresponding to the head temperature signal TC and the amplification circuit 510. As a result, when the voltage value of the head temperature signal TC is the voltage Vt[q], the voltage Va[q], which is the voltage value of the head temperature amplification signal ATC output by the amplification circuit 510, decreases as illustrated in FIG. 19B. In other words, when the voltage value of the head temperature signal TC is the voltage Vt[q], the voltage Va[q], which is the voltage value of the head temperature amplification signal ATC output by the amplification circuit 510, is close to the ideal voltage Var.

The control circuit 500 repeatedly performs the adjustment of the voltage vref based on the comparison result between the voltage Va[q], which is the voltage value of the head temperature amplification signal ATC, and the ideal voltage Var. When the voltage value of the head temperature signal TC is the voltage Vt[q], the voltage Vt[q], which is the voltage value of the head temperature amplification signal ATC output by the amplification circuit 510, is within a predetermined range of the ideal voltage Var. Thus, as illustrated in FIG. 19C, the voltage value of the head temperature amplification signal ATC output by the amplification circuit 510 is substantially equal to the voltage value of the head temperature amplification signal ATC output by the amplification circuit 510 when the ideal head temperature signal TC is input to the amplification circuit 510.

As described above, the liquid ejecting apparatus 1 and the head unit 20 of the present embodiment corrects the variation in the voltage value of the head temperature information tc, which occurs due to the variation in the resistance value of the resistance wiring 401 of the temperature detection circuit 24, by adjusting the voltage value of the reference potential signal Vref. Accordingly, the risk that the voltage value of the head temperature amplification signal ATC is limited in a state in which the dynamic range of the amplification circuit 510 is widely secured is reduced, and as a result, the risk of deteriorating the reliability of the head temperature amplification signal ATC output by the amplification circuit 510 is reduced. Therefore, the accuracy of the temperature information about the print head 22 of the temperature information signal TI output by the temperature information output circuit 26 is improved.

Considering that the drive signal COM is an example of the drive signal and the drive signal VOUT is generated by selecting or not selecting the signal waveform of the drive signal COM, the drive signal VOUT is also an example of the drive signal.

Further, the temperature information output circuit 26 is an example of a temperature information output circuit, the temperature information signal TI output by the temperature information output circuit 26 is an example of a temperature information signal, the amplification circuit 510-1 of the temperature information output circuit 26 is an example of a first amplification circuit, the amplification circuit 510-2 of the temperature information output circuit 26 is an example of a second amplification circuit, the temperature information output section 504 of the temperature information output circuit 26 is an example of an output control circuit, the control circuit 500 and the DA conversion circuit 560 of the temperature information output circuit 26 are examples of a reference voltage control circuit, and the storage circuit 570 of the temperature information output circuit 26 is an example of a storage section.

Further, the head temperature information tc1 is an example of first temperature information, the head temperature information tc2 is an example of second temperature information, the head temperature signal TC1 including the head temperature information tc1 is an example of a first temperature signal, the head temperature signal TC2 including the head temperature information tc2 is an example of a second temperature signal, the voltage vref1 is an example of a first reference voltage value, the voltage vref2 is an example of a second reference voltage value, the reference potential signal Vref of the voltage vref1 is an example of a first reference potential signal, and the reference potential signal Vref of the voltage vref2 is an example of a second reference potential signal.

Further, the print head 22-1 is an example of a first print head, the electrode 360 of the print head 22-1 is an example of a first electrode, the electrode 380 of the print head 22-1 is an example of a second electrode, the piezoelectric body 370 of the print head 22-1 is an example of a first piezoelectric body, the piezoelectric element 60 of the print head 22-1 is an example of a first piezoelectric element, the vibration plate 350 of the print head 22-1 is an example of a first vibration plate, the pressure chamber 312 of the print head 22-1 is an example of a first pressure chamber, the pressure chamber substrate 310 of the print head 22-1 is an example of a first pressure chamber substrate, the nozzle 321 of the print head 22-1 is an example of a first nozzle, and the resistance wiring 401 and the temperature detection circuit 24 of the print head 22-1 is an example of the first temperature detection section.

Further, the print head 22-2 is an example of the second print head, the electrode 360 of the print head 22-2 is an example of a third electrode, the electrode 380 of the print head 22-2 is an example of a fourth electrode, the piezoelectric body 370 of the print head 22-2 is an example of a second piezoelectric body, the piezoelectric element 60 of the print head 22-2 is an example of a second piezoelectric element, the vibration plate 350 of the print head 22-2 is an example of a second vibration plate, the pressure chamber 312 of the print head 22-2 is an example of a second pressure chamber, the pressure chamber substrate 310 of the print head 22-2 is an example of a second pressure chamber substrate, the nozzle 321 of the print head 22-2 is an example of a second nozzle, and the resistance wiring 401 and the temperature detection circuit 24 of the print head 22-2 is an example of the second temperature detection section.

The direction along the Z axis is an example of a first stacking direction and a second stacking direction, and the +Z side in the direction along the Z axis is an example of one side in the first stacking direction and the second stacking direction. The −Z side in the direction along the Z axis is an example of the other side of the first stacking direction and the second stacking direction.

3. Operational Effect

As described above, the print head 22 of the liquid ejecting apparatus 1 and the head unit 20 of the present embodiment includes: the piezoelectric element 60 including the electrode 360, the electrode 380, and the piezoelectric body 370, having the piezoelectric body 370 that is located between the electrode 360 and the electrode 380 in the direction along the Z axis, which is the stacking direction in which the electrode 360, the electrode 380, and the piezoelectric body 370 are stacked, and driven by receiving the drive signal VOUT based on the drive signal COM; the vibration plate 350 located one side of the piezoelectric element 60 in the stacking direction and deformed by drive of the piezoelectric element 60; the pressure chamber substrate 310 located on one side of the vibration plate 350 in the stacking direction and provided with the pressure chamber 312 having a volume that changes due to deformation of the vibration plate 350; the nozzle 321 for ejecting the ink according to the change in volume of the pressure chamber 312; and the temperature detection circuit 24 including the resistance wiring 401 that is located on the other side of the vibration plate 350 in the stacking direction to detect the head temperature information tc corresponding to the temperature of the pressure chamber 312 and output the head temperature information tc as the head temperature signal TC. That is, in the print head 22 of the present embodiment, the temperature detection circuit 24 that detects the temperature of the ink stored in the pressure chamber 312 is disposed near the pressure chamber 312. As a result, the detection accuracy of the temperature of the ink stored in the pressure chamber 312 by the temperature detection circuit 24 is improved.

Further, the temperature information output circuit 26 of the liquid ejecting apparatus 1 and the head unit 20 of the present embodiment includes: the amplification circuit 510 that amplifies the difference between the reference potential signal Vref and the head temperature signal TC; the temperature information output section 504 that outputs the temperature information signal TI according to the output of the amplification circuit 510; and the control circuit 500 and the DA conversion circuit 560 that control the voltage value of the reference potential signal Vref. As a result, it is possible to adjust the voltage range of the head temperature amplification signal ATC output by the amplification circuit 510 without changing the amplification rate of the amplification circuit 510. Accordingly, the detection accuracy of the head temperature signal TC by the temperature detection circuit 24 is improved, and the output accuracy of the head temperature amplification signal ATC output by the amplification circuit 510 is improved. As a result, it is possible to improve the detection accuracy of the temperature of the print head 22 based on the head temperature amplification signal ATC output by the amplification circuit 510.

4. Modification Example

In the above-described embodiment, the description is made in which the ideal voltage Var are calculated based on the temperature of the head unit 20 detected by the temperature detection circuit 28, and the voltage vref, which is the voltage value of the reference potential signal Vref, is adjusted using the calculated ideal voltage Var. However, when adjusting the voltage vref, which is the voltage value of the reference potential signal Vref, the liquid ejecting apparatus 1 or the head unit 20 may be installed in the environment where the temperature is constant, and the ideal voltage Var may be calculated based on the temperature, and the voltage vref, which is the voltage value of the reference potential signal Vref, may be adjusted using the calculated ideal voltage Var. Even with such a configuration, the same operational effect as that in the above-described embodiment can be obtained.

The embodiment has been described above, but the present disclosure is not limited to the embodiments and the modification examples, and can be implemented in various aspects without departing from the gist thereof. For example, the above-described embodiment can be combined as appropriate.

The present disclosure includes substantially the same configurations (for example, configurations having the same functions, methods, and results, or configurations having the same objects and effects) as the configurations described in the embodiment. Further, the present disclosure includes configurations in which non-essential parts of the configuration described in the embodiment are replaced. In addition, the present disclosure includes configurations that achieve the same operational effects or configurations that can achieve the same objects as those of the configurations described in the embodiment. Further, the present disclosure includes configurations in which a known technology is added to the configurations described in the embodiment.

The following contents are derived from the above-described embodiment.

An aspect of a head unit is a head unit that ejects a liquid by receiving a drive signal corrected based on a temperature information signal, the head unit including: a first print head that receives the drive signal and ejects a liquid; and a temperature information output circuit that outputs the temperature information signal indicating a temperature of the first print head, in which the first print head includes: a first piezoelectric element including a first electrode, a second electrode, and a first piezoelectric body, having the first piezoelectric body that is located between the first electrode and the second electrode in a first stacking direction in which the first electrode, the second electrode, and the first piezoelectric body are stacked, and driven by receiving the drive signal; a first vibration plate located on one side of the first piezoelectric element in the first stacking direction and deformed due to drive of the first piezoelectric element; a first pressure chamber substrate located on one side of the first vibration plate in the first stacking direction and provided with a first pressure chamber having a volume that changes due to deformation of the first vibration plate; a first nozzle for ejecting the liquid according to change in the volume of the first pressure chamber; and a first temperature detection section located on another side of the first vibration plate in the first stacking direction to detect first temperature information corresponding to a temperature of the first pressure chamber and output the first temperature information as a first temperature signal, and the temperature information output circuit includes: a first amplification circuit that amplifies a difference between a first reference potential signal and the first temperature signal; an output control circuit that outputs the temperature information signal according to an output of the first amplification circuit; and a reference voltage control circuit that controls a voltage value of the first reference potential signal.

According to the head unit, the reference voltage control circuit controls the voltage value of the first reference potential signal amplified by the first amplification circuit, so that even when the variation occurs in the voltage value of the first temperature information, which is the voltage value of the first temperature signal output by the first temperature detection section, the first amplification circuit can acquire the first temperature signal in a state where the dynamic range is secured. As a result, the acquisition accuracy of the first temperature signal in the first amplification circuit is improved. As a result, the accuracy of the output of the first amplification circuit is improved, and the accuracy of the temperature information signal output by the temperature information output circuit according to the output of the first amplification circuit is improved. That is, the acquisition accuracy of the temperature of the print head in the temperature information output circuit is improved.

The aspect of the head unit the temperature information output circuit may include a storage section, the storage section may store a first reference voltage value according to the first temperature information and an ambient temperature of the first print head, and the reference potential signal having a voltage value according to the first reference voltage value.

According to the head unit, the first reference voltage value is calculated according to the voltage value of the first temperature information, which is the voltage value of the first temperature signal output by the first temperature detection section, and the ambient temperature of the print head, and the calculated first reference voltage value is stored in the storage section, and the reference voltage control circuit controls the voltage value of the first reference potential signal based on the first reference voltage value. That is, the reference voltage control circuit outputs the first reference potential signal of the voltage value calculated based on the ambient temperature of the print head. As a result, the accuracy of the voltage value of the first reference potential signal output by the reference voltage control circuit is further improved.

In the aspect of the head unit, may further include a second print head that ejects the liquid by receiving the drive signal, in which the second print head may include: a second piezoelectric element including a third electrode, a fourth electrode, and a second piezoelectric body, having the second piezoelectric body that is located between the third electrode and the fourth electrode in a second stacking direction in which the third electrode, the fourth electrode, and the second piezoelectric body are stacked, and driven by receiving the drive signal; a second vibration plate located on one side of the second piezoelectric element in the second stacking direction and deformed due to drive of the second piezoelectric element; a second pressure chamber substrate located on one side of the second vibration plate in the second stacking direction and provided with a second pressure chamber having a volume that changes due to deformation of the second vibration plate; a second nozzle for ejecting the liquid according to change in the volume of the second pressure chamber; and a second temperature detection section located on another side of the second vibration plate in the second stacking direction to detect second temperature information corresponding to a temperature of the second pressure chamber and output the second temperature information as a second temperature signal, the temperature information output circuit may include a second amplification circuit that amplifies a difference between a second reference potential signal and the second temperature signal, the reference voltage control circuit may output the second reference potential signal of a voltage value according to the second temperature signal to the second amplification circuit, and the output control circuit may output the temperature information signal according to at least one of an output of the first amplification circuit and an output of the second amplification circuit.

Even when the head unit includes the second amplification circuit that acquires the second temperature signal in addition to the first amplification circuit that acquires the first temperature signal, according to the head unit, the reference voltage control circuit controls the voltage value of the second reference potential signal amplified by the second amplification circuit, so that even when the variation in the voltage value of the second temperature information, which is the voltage value of the second temperature signal output by the second temperature detection section, occurs, the second amplification circuit can acquire the second temperature signal in a state where the dynamic range is secured. As a result, the acquisition accuracy of the second temperature signal in the second amplification circuit is improved. As a result, the accuracy of the output of the second amplification circuit is also improved, and the accuracy of the temperature information signal output by the temperature information output circuit according to the output of the second amplification circuit is improved. That is, even when the head unit includes a plurality of amplification circuits and the plurality of amplification circuits acquire the corresponding temperature signal, the acquisition accuracy of the temperature of the print head in the temperature information output circuit is improved.

The aspect of the head unit may further include a storage section, in which the storage section may store a first reference voltage value according to the first temperature information and an ambient temperature of the first print head, and a second reference voltage value according to the second temperature information and an ambient temperature of the second print head, and the reference voltage control circuit may output the first reference potential signal of a voltage value according to the first reference voltage value, and the second reference potential signal of a voltage value according to the second reference voltage value.

According to the head unit, the first reference voltage value is calculated according to the voltage value of the first temperature information, which is the voltage value of the first temperature signal output by the first temperature detection section, and the ambient temperature of the print head, and the second reference voltage value is calculated according to the voltage value of the second temperature information, which is the voltage value of the second temperature signal output by the second temperature detection section, and the ambient temperature of the print head, and the storage section stores the calculated first reference voltage value and second reference voltage value. Then, the reference voltage control circuit controls the voltage value of the first reference potential signal based on the first reference voltage value, and controls the voltage value of the second reference potential signal based on the second reference voltage value. That is, the reference voltage control circuit outputs the first reference potential signal and second reference potential signal of the voltage values calculated based on the ambient temperature of the print head. As a result, the accuracy of the voltage value of the first reference potential signal and the voltage value of the second reference potential signal output by the reference voltage control circuit is further improved.

The aspect of the head unit the first temperature detection section may include a wiring pattern stacked on a surface on the other side of the first vibration plate, and the wiring pattern may include platinum.

According to the head unit, the first temperature detection section includes the wiring pattern containing platinum with excellent linearity with respect to temperature, and the wiring pattern is stacked on the first vibration plate, whereby the first temperature detection section can be disposed closer to the first pressure chamber, and the detection accuracy of the first temperature information corresponding to the temperature of the first pressure chamber by the first temperature detection section is further improved.

An aspect of a liquid ejecting apparatus includes a drive signal output circuit that outputs a drive signal corrected based on a temperature information signal; and a head unit that ejects a liquid by receiving the drive signal, in which the head unit includes: a first print head that receives the drive signal and ejects a liquid; and a temperature information output circuit that outputs the temperature information signal indicating a temperature of the first print head, the first print head includes: a first piezoelectric element including a first electrode, a second electrode, and a first piezoelectric body, having the first piezoelectric body that is located between the first electrode and the second electrode in a first stacking direction in which the first electrode, the second electrode, and the first piezoelectric body are stacked, and driven by receiving the drive signal; a first vibration plate located on one side of the first piezoelectric element in the first stacking direction and deformed due to drive of the first piezoelectric element; a first pressure chamber substrate located on one side of the first vibration plate in the first stacking direction and provided with a first pressure chamber having a volume that changes due to deformation of the first vibration plate; a first nozzle for ejecting the liquid according to change in the volume of the first pressure chamber; and a first temperature detection section located on another side of the first vibration plate in the first stacking direction to detect first temperature information corresponding to a temperature of the first pressure chamber and output the first temperature information as a first temperature signal, and the temperature information output circuit includes: a first amplification circuit that amplifies a difference between a first reference potential signal and the first temperature signal; an output control circuit that outputs an output of the first amplification circuit as the temperature information signal; a reference voltage control circuit that controls a voltage value of the first reference potential signal.

According to the liquid ejecting apparatus, the reference voltage control circuit controls a voltage value of the first reference potential signal amplified by the first amplification circuit of the head unit, so that even when the variation occurs in the voltage value of the first temperature information, which is the voltage value of the first temperature signal output by the first temperature detection section, the first amplification circuit can acquire the first temperature signal in a state where the dynamic range is secured. As a result, the acquisition accuracy of the first temperature signal in the first amplification circuit is improved. As a result, the accuracy of the output of the first amplification circuit is improved, and the accuracy of the temperature information signal output by the temperature information output circuit according to the output of the first amplification circuit is improved. That is, the acquisition accuracy of the temperature of the print head in the temperature information output circuit is improved.

In the aspect of the liquid ejecting apparatus, the temperature information output circuit may include a storage section, the storage section may store a first reference voltage value according to the first temperature information and an ambient temperature of the first print head, and the reference potential signal having a voltage value according to the first reference voltage value.

According to this liquid ejecting apparatus, the first reference voltage value is calculated according to the voltage value of the first temperature information, which is the voltage value of the first temperature signal output by the first temperature detection section of the head unit, and the ambient temperature of the print head, and the calculated first reference voltage value is stored in the storage section, and the reference voltage control circuit controls the voltage value of the first reference potential signal based on the first reference voltage value. That is, the reference voltage control circuit outputs the first reference potential signal of the voltage value calculated based on the ambient temperature of the print head. As a result, the accuracy of the voltage value of the first reference potential signal output by the reference voltage control circuit is further improved.

In the aspect of the liquid ejecting apparatus, the head unit may include a second head that ejects the liquid by receiving the drive signal, in which the second print head may include: a second piezoelectric element including a third electrode, a fourth electrode, and a second piezoelectric body, having the second piezoelectric body that is located between the third electrode and the fourth electrode in a second stacking direction in which the third electrode, the fourth electrode, and the second piezoelectric body are stacked, and driven by receiving the drive signal; a second vibration plate that is located on one side of the second stacking direction with respect to the second piezoelectric element and is deformed by driving the second piezoelectric element, a second pressure chamber substrate located on one side of the second vibration plate in the second stacking direction and provided with a second pressure chamber having a volume that changes due to deformation of the second vibration plate; a second nozzle for ejecting the liquid according to change in the volume of the second pressure chamber; and a second temperature detection section located on another side of the second vibration plate in the second stacking direction to detect second temperature information corresponding to a temperature of the second pressure chamber and output the second temperature information as a second temperature signal, the temperature information output circuit may include a second amplification circuit that amplifies a difference between a second reference potential signal and the second temperature signal, the reference voltage control circuit may output the second reference potential signal of a voltage value according to the second temperature signal to the second amplification circuit, and the output control circuit may output the temperature information signal according to at least one of an output of the first amplification circuit and an output of the second amplification circuit.

Even when the head unit includes the second amplification circuit that acquires the second temperature signal in addition to the first amplification circuit that acquires the first temperature signal, according to the liquid ejecting apparatus, in the head unit, the reference voltage control circuit controls the voltage value of the second reference potential signal amplified by the second amplification circuit, so that even when the variation in the voltage value of the second temperature information, which is the voltage value of the second temperature signal output by the second temperature detection section, occurs, the second amplification circuit can acquire the second temperature signal in a state where the dynamic range is secured. As a result, the acquisition accuracy of the second temperature signal in the second amplification circuit is improved. As a result, the accuracy of the output of the second amplification circuit is also improved, and the accuracy of the temperature information signal output by the temperature information output circuit according to the output of the second amplification circuit is improved. That is, even when the head unit includes a plurality of amplification circuits and the plurality of amplification circuits acquire the corresponding temperature signal, the acquisition accuracy of the temperature of the print head in the temperature information output circuit is improved.

The aspect of the liquid ejecting apparatus may further include a storage section, in which the storage section may store a first reference voltage value according to the first temperature information and an ambient temperature of the first print head, and a second reference voltage value according to the second temperature information and an ambient temperature of the second print head, and the reference voltage control circuit may output the first reference potential signal of a voltage value according to the first reference voltage value, and the second reference potential signal of a voltage value according to the second reference voltage value.

According to the liquid ejecting apparatus, in the head unit, the first reference voltage value is calculated according to the voltage value of the first temperature information, which is the voltage value of the first temperature signal output by the first temperature detection section, and the ambient temperature of the print head, and the second reference voltage value is calculated according to the voltage value of the second temperature information, which is the voltage value of the second temperature signal output by the second temperature detection section, and the ambient temperature of the print head, and the storage section stores the calculated first reference voltage value and second reference voltage value. Then, the reference voltage control circuit controls the voltage value of the first reference potential signal based on the first reference voltage value, and controls the voltage value of the second reference potential signal based on the second reference voltage value. That is, the reference voltage control circuit outputs the first reference potential signal and second reference potential signal of the voltage values calculated based on the ambient temperature of the print head. As a result, the accuracy of the voltage value of the first reference potential signal and the voltage value of the second reference potential signal output by the reference voltage control circuit is further improved. In the aspect of the liquid ejecting apparatus, the first temperature detection section may include a wiring pattern stacked on a surface on the other side of the first vibration plate, and the wiring pattern may include platinum.

According to the liquid ejecting apparatus, the first temperature detection section includes the wiring pattern containing platinum with excellent linearity with respect to temperature, and the wiring pattern is stacked on the first vibration plate, whereby the first temperature detection section can be disposed closer to the first pressure chamber, and the detection accuracy of the first temperature information corresponding to the temperature of the first pressure chamber by the first temperature detection section is further improved.

What is claimed is:

1. A head unit that ejects a liquid by receiving a drive signal corrected based on a temperature information signal, the head unit comprising:

a first print head that ejects the liquid by receiving the drive signal; and a temperature information output circuit that outputs the temperature information signal indicating a temperature of the first print head, wherein the first print head includes:

a first piezoelectric element including a first electrode, a second electrode, and a first piezoelectric body, having the first piezoelectric body that is located between the first electrode and the second electrode in a first stacking direction in which the first electrode, the second electrode, and the first piezoelectric body are stacked, and driven by receiving the drive signal;

a first vibration plate located on one side of the first piezoelectric element in the first stacking direction and deformed due to drive of the first piezoelectric element;

a first pressure chamber substrate located on one side of the first vibration plate in the first stacking direction and provided with a first pressure chamber having a volume that changes due to deformation of the first vibration plate;

a first nozzle for ejecting the liquid according to change in the volume of the first pressure chamber; and a first temperature detection section located on another side of the first vibration plate in the first stacking direction to detect first temperature information corresponding to a temperature of the first pressure chamber and output the first temperature information as a first temperature signal, and the temperature information output circuit includes:

a first amplification circuit that amplifies a difference between a first reference potential signal and the first temperature signal;

an output control circuit that outputs the temperature information signal according to an output of the first amplification circuit; and a reference voltage control circuit that controls a voltage value of the first reference potential signal.

2. The head unit according to claim 1, wherein the temperature information output circuit includes a storage section, the storage section stores a first reference voltage value according to the first temperature information and an ambient temperature of the first print head, and the reference voltage control circuit outputs the first reference potential signal of a voltage value according to the first reference voltage value.

3. The head unit according to claim 1, further comprising:

a second print head that ejects the liquid by receiving the drive signal, wherein the second print head includes:

a second piezoelectric element including a third electrode, a fourth electrode, and a second piezoelectric body, having the second piezoelectric body that is located between the third electrode and the fourth electrode in a second stacking direction in which the third electrode, the fourth electrode, and the second piezoelectric body are stacked, and driven by receiving the drive signal;

a second vibration plate located on one side of the second piezoelectric element in the second stacking direction and deformed due to drive of the second piezoelectric element;

a second pressure chamber substrate located on one side of the second vibration plate in the second stacking direction and provided with a second pressure chamber having a volume that changes due to deformation of the second vibration plate;

a second nozzle for ejecting the liquid according to change in the volume of the second pressure chamber; and a second temperature detection section located on another side of the second vibration plate in the second stacking direction to detect second temperature information corresponding to a temperature of the second pressure chamber and output the second temperature information as a second temperature signal, the temperature information output circuit includes a second amplification circuit that amplifies a difference between a second reference potential signal and the second temperature signal, the reference voltage control circuit outputs the second reference potential signal of a voltage value according to the second temperature signal to the second amplification circuit, and the output control circuit outputs the temperature information signal according to at least one of an output of the first amplification circuit and an output of the second amplification circuit.

4. The head unit according to claim 3, further comprising:

a storage section, wherein the storage section stores a first reference voltage value according to the first temperature information and an ambient temperature of the first print head and a second reference voltage value according to the second temperature information and an ambient temperature of the second print head, and the reference voltage control circuit outputs the first reference potential signal of a voltage value according to the first reference voltage value and outputs the second reference potential signal of a voltage value according to the second reference voltage value.

5. The head unit according to claim 1, wherein the first temperature detection section includes a wiring pattern stacked on a surface on the other side of the first vibration plate, and the wiring pattern includes platinum.

6. A liquid ejecting apparatus comprising:

a drive signal output circuit that outputs a drive signal corrected based on a temperature information signal; and a head unit that ejects a liquid by receiving the drive signal, wherein the head unit includes:

a first print head that ejects the liquid by receiving the drive signal; and a temperature information output circuit that outputs the temperature information signal indicating a temperature of the first print head, the first print head includes:

a first piezoelectric element including a first electrode, a second electrode, and a first piezoelectric body, having the first piezoelectric body that is located between the first electrode and the second electrode in a first stacking direction in which the first electrode, the second electrode, and the first piezoelectric body are stacked, and driven by receiving the drive signal;

a first vibration plate located on one side of the first piezoelectric element in the first stacking direction and deformed due to drive of the first piezoelectric element;

a first pressure chamber substrate located on one side of the first vibration plate in the first stacking direction and provided with a first pressure chamber having a volume that changes due to deformation of the first vibration plate;

a first nozzle for ejecting the liquid according to change in the volume of the first pressure chamber; and a first temperature detection section located on another side of the first vibration plate in the first stacking direction to detect first temperature information corresponding to a temperature of the first pressure chamber and output the first temperature information as a first temperature signal, and the temperature information output circuit includes:

a first amplification circuit that amplifies a difference between a first reference potential signal and the first temperature signal;

an output control circuit that outputs the temperature information signal according to an output of the first amplification circuit; and a reference voltage control circuit that controls a voltage value of the first reference potential signal.

7. The liquid ejecting apparatus according to claim 6, wherein the temperature information output circuit includes a storage section, the storage section stores a first reference voltage value according to the first temperature information and an ambient temperature of the first print head, and the reference voltage control circuit outputs the first reference potential signal of a voltage value according to the first reference voltage value.

8. The liquid ejecting apparatus according to claim 6, wherein the head unit includes a second print head that ejects the liquid by receiving the drive signal, the second print head includes:

a second piezoelectric element including a third electrode, a fourth electrode, and a second piezoelectric body, having the second piezoelectric body that is located between the third electrode and the fourth electrode in a second stacking direction in which the third electrode, the fourth electrode, and the second piezoelectric body are stacked, and driven by receiving the drive signal;

a second vibration plate located on one side of the second piezoelectric element in the second stacking direction and deformed due to drive of the second piezoelectric element;

a second pressure chamber substrate located on one side of the second vibration plate in the second stacking direction and provided with a second pressure chamber having a volume that changes due to deformation of the second vibration plate;

a second nozzle for ejecting the liquid according to change in the volume of the second pressure chamber; and a second temperature detection section located on another side of the second vibration plate in the second stacking direction to detect second temperature information corresponding to a temperature of the second pressure chamber and output the second temperature information as a second temperature signal, the temperature information output circuit includes a second amplification circuit that amplifies a difference between a second reference potential signal and the second temperature signal, the reference voltage control circuit outputs the second reference potential signal of a voltage value according to the second temperature signal to the second amplification circuit, and the output control circuit outputs the temperature information signal according to at least one of an output of the first amplification circuit and an output of the second amplification circuit.

9. The liquid ejecting apparatus according to claim 8, further comprising:

a storage section, wherein the storage section stores a first reference voltage value according to the first temperature information and an ambient temperature of the first print head and a second reference voltage value according to the second temperature information and an ambient temperature of the second print head, and the reference voltage control circuit outputs the first reference potential signal of a voltage value according to the first reference voltage value and outputs the second reference potential signal of a voltage value according to the second reference voltage value.

10. The liquid ejecting apparatus according to claim 6, wherein the first temperature detection section includes a wiring pattern stacked on a surface on the other side of the first vibration plate, and the wiring pattern includes platinum.

* * * * *